(12) United States Patent
Vermani et al.

(10) Patent No.: US 10,383,092 B2
(45) Date of Patent: Aug. 13, 2019

(54) BEAMFORMING REPORT STRUCTURE

(71) Applicant: QUALCOMM Incorporated, San Diego, CA (US)

(72) Inventors: Sameer Vermani, San Diego, CA (US); Bin Tian, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/341,982

(22) Filed: Nov. 2, 2016

(65) Prior Publication Data
US 2017/0127385 A1 May 4, 2017

Related U.S. Application Data

(60) Provisional application No. 62/335,007, filed on May 11, 2016, provisional application No. 62/322,176, filed on Apr. 13, 2016, provisional application No. 62/250,425, filed on Nov. 3, 2015.

(51) Int. Cl.
| | |
|---|---|
| *H04W 72/04* | (2009.01) |
| *H04B 7/04* | (2017.01) |
| *H04B 7/06* | (2006.01) |
| *H04B 7/0413* | (2017.01) |
| *H04B 7/0417* | (2017.01) |

(52) U.S. Cl.
CPC .......... *H04W 72/04* (2013.01); *H04B 7/0413* (2013.01); *H04B 7/0417* (2013.01); *H04B 7/0617* (2013.01); *H04B 7/0626* (2013.01); *H04B 7/0634* (2013.01); *H04B 7/0643* (2013.01)

(58) Field of Classification Search
CPC ........... H04W 72/04; H04B 7/04; H04B 7/06
See application file for complete search history.

(56) References Cited

U.S. PATENT DOCUMENTS

| | | | |
|---|---|---|---|
| 9,490,882 B1* | 11/2016 | Schelstraete | H04B 7/0452 |
| 2007/0286303 A1 | 12/2007 | Yamaura | |
| 2010/0054356 A1* | 3/2010 | Keerthi | H04B 7/0617 375/267 |
| 2011/0159866 A1 | 6/2011 | Kim et al. | |
| 2011/0194644 A1 | 8/2011 | Liu et al. | |
| 2011/0199968 A1 | 8/2011 | Kim et al. | |
| 2011/0273977 A1* | 11/2011 | Shapira | H04B 7/0452 370/208 |
| 2012/0026909 A1 | 2/2012 | Seok | |
| 2012/0140753 A1 | 6/2012 | Lee et al. | |
| 2012/0257664 A1 | 10/2012 | Yue et al. | |
| 2013/0034003 A1 | 2/2013 | Shapira | |
| 2013/0089056 A1 | 4/2013 | Iwai et al. | |
| 2014/0044112 A1* | 2/2014 | Stephens | H04W 24/10 370/338 |

(Continued)

OTHER PUBLICATIONS

International Search Report and Written Opinion—PCT/US2016/060242—ISA/EPO—dated Jan. 26, 2017.

(Continued)

*Primary Examiner* — Xavier Szewai Wong
(74) *Attorney, Agent, or Firm* — Patterson & Sheridan, L.L.P.

(57) ABSTRACT

Aspects of the present disclosure provide techniques for sounding procedures and feedback report formats.

24 Claims, 35 Drawing Sheets

(56) References Cited

U.S. PATENT DOCUMENTS

| | | |
|---|---|---|
| 2014/0286246 A1 | 9/2014 | Bao et al. |
| 2014/0301240 A1 | 10/2014 | Park et al. |
| 2015/0071233 A1 | 3/2015 | Wang et al. |
| 2015/0110046 A1 | 4/2015 | Merlin et al. |
| 2016/0080052 A1 | 3/2016 | Li et al. |
| 2016/0204912 A1 | 7/2016 | Sun et al. |
| 2016/0204960 A1 | 7/2016 | Yu |
| 2016/0226638 A1 | 8/2016 | Azizi et al. |
| 2016/0233932 A1* | 8/2016 | Hedayat ............... H04B 7/0421 |
| 2016/0249366 A1* | 8/2016 | Seok ...................... H04B 7/024 |
| 2016/0255606 A1* | 9/2016 | Chu .................... H04W 72/005 370/312 |
| 2016/0330732 A1* | 11/2016 | Moon ................... H04B 7/0617 |
| 2017/0033898 A1 | 2/2017 | Chun et al. |
| 2017/0054542 A1 | 2/2017 | Vermani et al. |
| 2017/0070914 A1* | 3/2017 | Chun ...................... H04W 4/70 |
| 2018/0205442 A1* | 7/2018 | Oteri .................... H04B 7/0417 |
| 2018/0376458 A1* | 12/2018 | Cariou ................. H04W 72/04 |

OTHER PUBLICATIONS

Madhavan N., "Reducing Channel Sounding Protocol Overhead for 11ax, 11-15-1097-01-00ax-Reducing-Channel-Sounding-Protocol-Overhead-for-11ax", IEEE Draft, 11-15-1097-01-00AX-Reducing-Channel-Sounding-Protocol-Overhead-for-11AX, IEEE—SA Mentor, Piscataway, NJ, USA, vol. 802, 11ax, No. 1, Sep. 15, 2015 (Sep. 15, 2015), pp. 1-16, XP068098331, [retrieved on Sep. 15, 2015].

* cited by examiner

HE20 with 7DC for OFDMA

| 4x1 | RU1 | [RU1:RU2] | [RU1:RU3] | [RU1:RU4] | [RU1:RU5] | [RU1:RU6] | [RU1:RU7] | [RU1:RU8] | [RU1:RU9] |
|---|---|---|---|---|---|---|---|---|---|
| # of RUs | 1 | 2 | 3 | 4 | 5 | 6 | 7 | 8 | 9 |
| # of feedback tones | 4 | 5 | 7 | 9 | 13 | 15 | 16 | 18 | 20 |
| Nc | 1 | 1 | 1 | 1 | 1 | 1 | 1 | 1 | 1 |
| SU type of feedback (codebook=1) | 132 | 166 | 230 | 294 | 418 | 482 | 516 | 580 | 644 |
| MU type of feedback (codebook=0) | 168 | 208 | 288 | 368 | 528 | 608 | 648 | 728 | 808 |
| % of MU overhead SU overhead | 27 | 25 | 25 | 25 | 26 | 26 | 26 | 26 | 25 |

| 8x2 | RU1 | [RU1:RU2] | [RU1:RU3] | [RU1:RU4] | [RU1:RU5] | [RU1:RU6] | [RU1:RU7] | [RU1:RU8] | [RU1:RU9] |
|---|---|---|---|---|---|---|---|---|---|
| # of RUs | 1 | 2 | 3 | 4 | 5 | 6 | 7 | 8 | 9 |
| # of feedback tones | 4 | 5 | 7 | 9 | 13 | 15 | 16 | 18 | 20 |
| Nc | 2 | 2 | 2 | 2 | 2 | 2 | 2 | 2 | 2 |
| SU type of feedback (codebook=1) | 544 | 682 | 950 | 1218 | 1746 | 2014 | 2152 | 2420 | 2688 |
| MU type of feedback (codebook=0) | 672 | 836 | 1164 | 1492 | 2148 | 2476 | 2640 | 2968 | 3296 |
| % of MU overhead SU overhead | 24 | 23 | 23 | 22 | 23 | 23 | 23 | 23 | 23 |

FIG. 32

3300 

- Average SNR
  - Average SNR, space-time stream 1 (averaged over entire FB BW)
  - ................
  - Average SNR, space-time stream Nc (averaged over entire FB BW)

- RU1
  - V matrix
    - Feedback Tone 1
    - Feedback Tone 2
    - ...
  - Delta SNR (per feedback tone)
    - Feedback Tone 1
      - Stream 1
      - Stream 2
      - ...
    - Feedback Tone 2
    - ...

- RU2
  - V matrix
    - Feedback Tone 1
    - Feedback Tone 2
    - ...
  - Delta SNR (per feedback tone)
    - ...

*Not necessarily exactly the same in size as different RU26 may have a different number of FB tones*

- Average SNR
  - Average SNR, space-time stream 1 (averaged over entire FB BW)
  - ................
  - Average SNR, space-time stream Nc (averaged over entire FB BW)

- RU1
  - V matrix
    - Feedback Tone 1
    - Feedback Tone 2
    - ...
  - Delta SNR (only one number per stream for an RU)
    - Average SNR for stream 1 (averaged over this RU)
    - Average SNR for stream 2 (averaged over this RU)
    - ..............

- RU2
  - V matrix
    - Feedback Tone 1
    - Feedback Tone 2
    - ...
  - Delta SNR (only one number per stream for an RU)
    - ...

- ......

*Not necessarily exactly the same in size as different RU26 may have a different number of FB tones*

- Average SNR
  - Average SNR, space-time stream 1 (averaged over entire FB BW)
  - ................
  - Average SNR, space-time stream Nc (averaged over entire FB BW)
- RU1
  - V matrix
    - Feedback Tone 1
    - Feedback Tone 2
    - ...

→ ✕ DO NOT TRANSMIT THIS

- Delta SNR (only one number per stream for an RU)
    - Average SNR for stream 1
    - Average SNR for stream 2
    - ............
- RU2
  - V matrix
    - Feedback Tone 1
    - Feedback Tone 2
    - ...

→ ✕ DO NOT TRANSMIT THIS

- Delta SNR (only one number per stream for an RU)
    - ...
- ............

| Nc Index | Nr Index | BW | Grouping | Codebook Information | Feedback Type | Remaining Feedback Segments | First Feedback Segment | RU Start Index | RU End Index | Sounding Dialog Token Number | Reserved |
|---|---|---|---|---|---|---|---|---|---|---|---|
| 3 | 3 | 2 | 1 | 1 | 2 | 3 | 1 | 7 | 7 | 6 | 4 |

Bits:

| Nc Index | Nr Index | BW | Grouping | Codebook Information | Feedback Type | Remaining Feedback Segments | First Feedback Segment | RU Start Index | RU End Index | Reserved | Sounding Dialog Token Number |
|---|---|---|---|---|---|---|---|---|---|---|---|
| 3 | 3 | 2 | 1 | 1 | 2 | 3 | 1 | 7 | 7 | 4 | 6 |

Bits:

3800B

BEAMFORMING REPORT STRUCTURE

CLAIM OF PRIORITY UNDER 35 U.S.C. § 119

The present Application for Patent claims benefit of U.S. Provisional Patent Application Ser. No. 62/250,425, filed Nov. 3, 2015, U.S. Provisional Patent Application Ser. No. 62/322,176, filed Apr. 13, 2016, and U.S. Provisional Patent Application Ser. No. 62/335,007, filed May 11, 2016, each assigned to the assignee hereof and hereby expressly incorporated by reference herein.

BACKGROUND

Field of the Disclosure

Certain aspects of the present disclosure generally relate to wireless communications and, more particularly, to sounding procedures for generating and feeding back channel information.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is being developed by the Institute of Electrical and Electronics Engineers (IEEE) 802.11ax task force. This development is driven by the desire to combine the spatial diversity gains achieved with multiple in-multiple out transmissions using multiple antennas with orthogonal frequency division multiplexing schemes, with subsets of frequencies assigned to different users.

To take advantage of these schemes, channel information across both spatial streams and different frequency regions may need to be fed back from stations to allow an access point to optimize performance. This feedback may be obtained through a sounding procedure, whereby a station generates channel information based on training fields in packets transmitted from the access point. During the sounding procedure, it may be desirable to limit the amount of feedback while still ensuring adequate performance.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure provide a method for wireless communications by an access point. The method generally includes generating one or more frames, collectively having one or more training fields allowing one or more stations to calculate channel information and an indication of resources for each device to use for feeding back the channel information, transmitting the one or more frames, and receiving, on the indicated resources, channel information from at least one of the stations calculated for a corresponding one or more reporting units based on the one or more training fields, wherein the channel information is received via a report containing a plurality of channel information parameters for each of the one or more reporting units.

Aspects of the present disclosure provide a method for wireless communications by an access point. The method generally includes receiving one or more frames, collectively having one or more training fields allowing one or more stations to calculate channel information and an indication of resources for each device to use for feeding back the channel information, generating channel information for one or more reporting units based on the one or more training fields, and transmitting the channel information via a report containing one or more channel information parameters for each of the one or more reporting units.

Aspects of the present disclosure also provide various other methods, apparatuses, and computer readable medium capable of performing the operations described above and herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 32 illustrates a table comparing overhead of different feedback reporting structures, in accordance with aspects of the present disclosure.

FIG. 33 illustrates another example structure for reporting multi-user (MU) feedback, in accordance with aspects of the present disclosure.

FIG. 34 illustrates another example structure for reporting single-user (SU) feedback, in accordance with aspects of the present disclosure.

FIG. 35 illustrates another example structure for reporting CQI-only feedback, in accordance with aspects of the present disclosure.

FIGS. 36, 37, 38A, and 38B illustrate example control fields, in accordance with aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
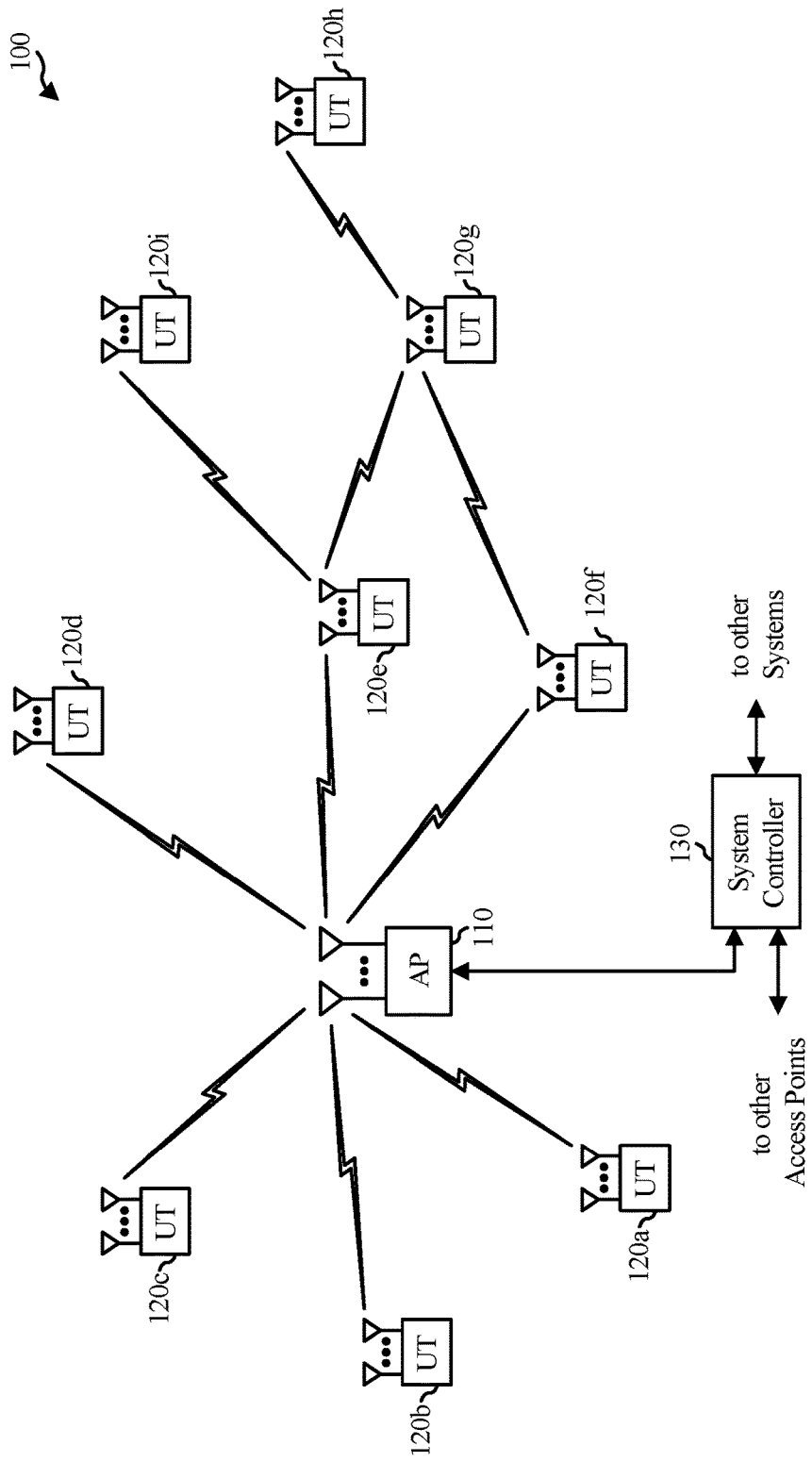
FIG. 1 illustrates a diagram of an example wireless communications network, in accordance with certain aspects of the present disclosure.

Aspects of the present disclosure generally relate to a sounding procedure whereby multiple stations may feedback channel information to an access point. The channel information, for example, may help the access point in optimizing performance when communicating with the multiple stations. In some cases, the stations may calculate channel information based on long training fields (LTFs) that use normal (1×) or extended symbol durations, such as 2× and 4× high efficiency (HE) LTFs. Resource allocation for such transmissions may be defined by what is commonly referred to as a "tone map" that indicates a number and location of tones to be used for communications between the access point and stations.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, any of the wireless stations including the access point 110 and/or the user terminals 120 may be in a neighbor aware network (NAN). Wireless stations may exchange fine timing measurement (FTM) information for ranging during a period when the wireless stations are already scheduled to wake up (e.g., during a paging window or data window) and may exchange the FTM information using existing frames (e.g., association frames, trigger/polling frames, probe request/probe response frames). In aspects, one of the wireless devices may act as a ranging proxy.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
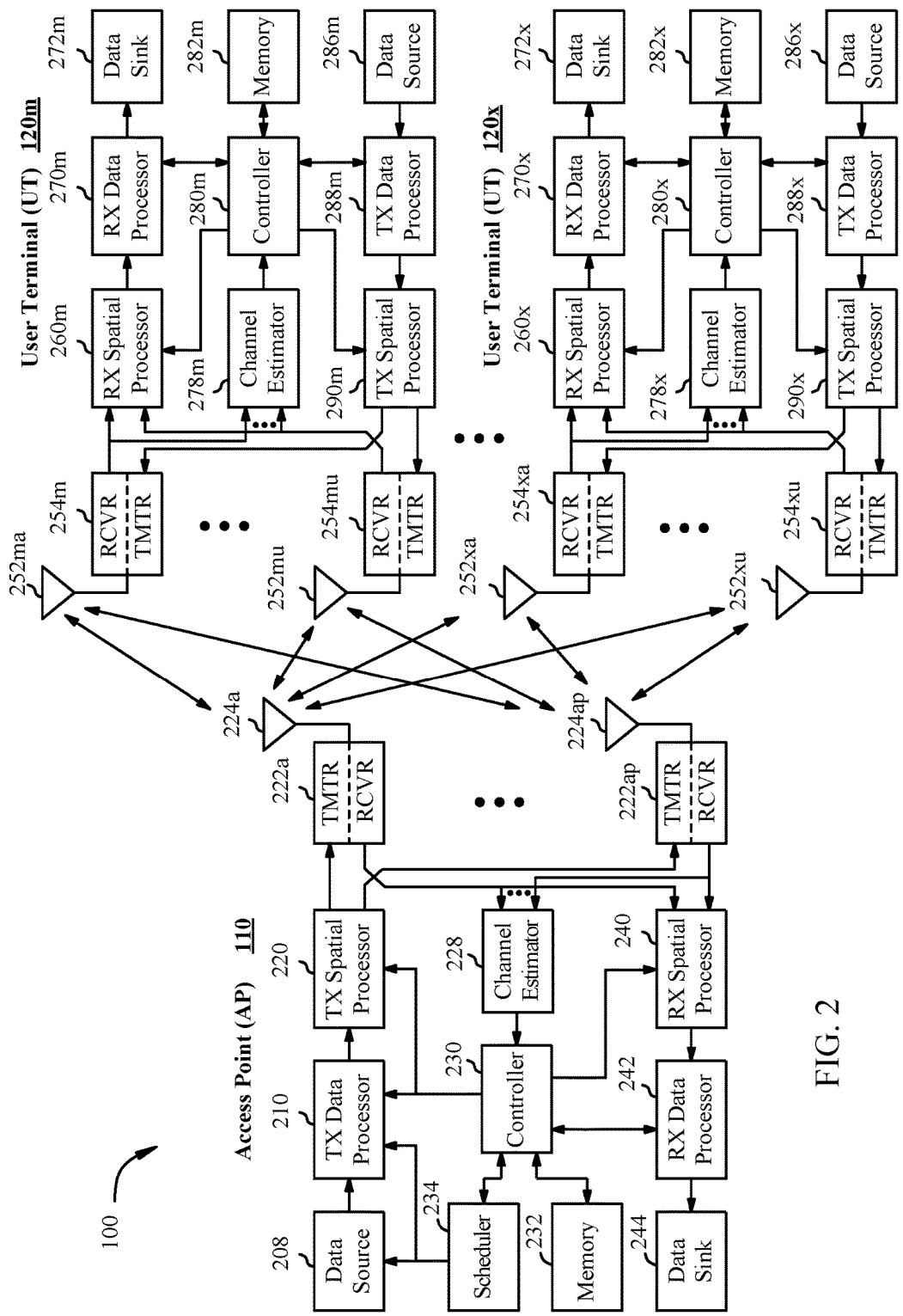
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, and/or processors 210, 220, 240, 242, of the AP 110, and/or controller 230 or antenna 252, Tx/Rx 254, processors 260, 270, 288, and 290, and/or controller 280 of UT 120 may be used to perform the operations 1500, 1600, 1800, 1900, 2200, 2300, 2400, and 2500 described herein with reference to FIGS. 15, 16, 18, 19, 22, 23, 24, and 25, respectively.

FIG. 2 illustrates a block diagram of access point 110 and two user terminals 120*m* and 120*x* in a MIMO system 100. The access point 110 is equipped with $N_t$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
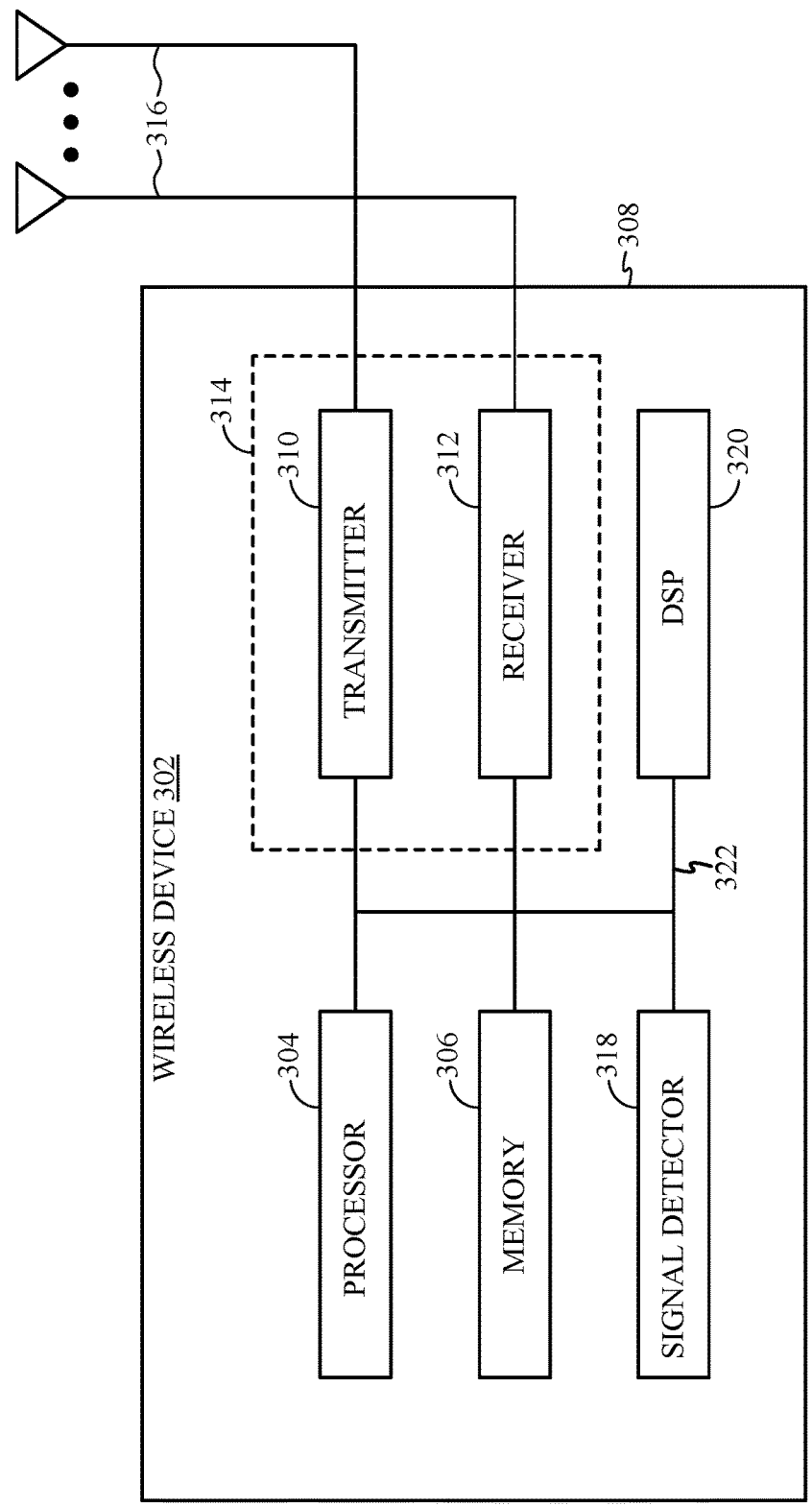
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations, 1600, 1800, 1900, 2200, 2300, 2400, and 2500 described herein with reference to FIGS. 15, 16, 18, 19, 22, 23, 24, and 25, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Tone Allocation

As described above, a packet (also referred to as a frame) may be communicated over a wireless medium using a waveform that is modulated over a fixed frequency band during a fixed period of time. The frequency band may be divided into one or more "tones" and the period of time may be divided into one or more "symbols." As an illustrative non-limiting example, a 20 MHz frequency band may be divided into four 5 MHz tones and an 80 microsecond period may be divided into twenty 4 microsecond symbols. Accordingly, a "tone" may represent a frequency sub-band included in a waveform. A tone may alternately be referred to as a subcarrier. A "tone" may thus be a frequency domain unit. A "symbol" may be a time domain unit representing a duration of time included in the waveform. Thus, the waveform for a wireless packet may thus be visualized as a two-dimensional structure that includes multiple tones (often on a vertical axis in units frequency) and multiple symbols (on a horizontal axis in units of time).

As an example, a wireless device may receive a packet via a 20 megahertz (MHz) wireless channel (e.g., a channel having 20 MHz bandwidth). The wireless device may perform a 64-point fast Fourier transform (FFT) to determine 64 tones in a waveform of the packet. A subset of the tones may be considered "useable" and the remaining tones may be considered "unusable" (e.g., may be guard tones, direct current (DC) tones, etc.). To illustrate, 56 of the 64 tones may be useable, including 52 data tones and 4 pilot tones. As another example, there may be 48 data tones and 4 pilot tones. It should be noted that the aforementioned channel bandwidths, transforms, and tone plans are for example. According to alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans may be used.

Example Sounding Procedure

Aspects of the present disclosure generally provide techniques that an access point may use for receiving feedback from a plurality of stations. As described herein, the AP may be able to specify what type of feedback is requested, as well as what resources should be used (by a reporting station) to generate the requested feedback. Aspects of the present disclosure provide various frame formats that allow an AP to specify the type of feedback as well as the measurement resources, as well as various frame formats that allow a station to provide (report) the feedback in the requested manner and format.

In any case, the feedback may help the access point optimize communications with the stations via wireless packets that utilize extended symbol durations (e.g., 2× and/or 4× symbol durations).

Figure 4:
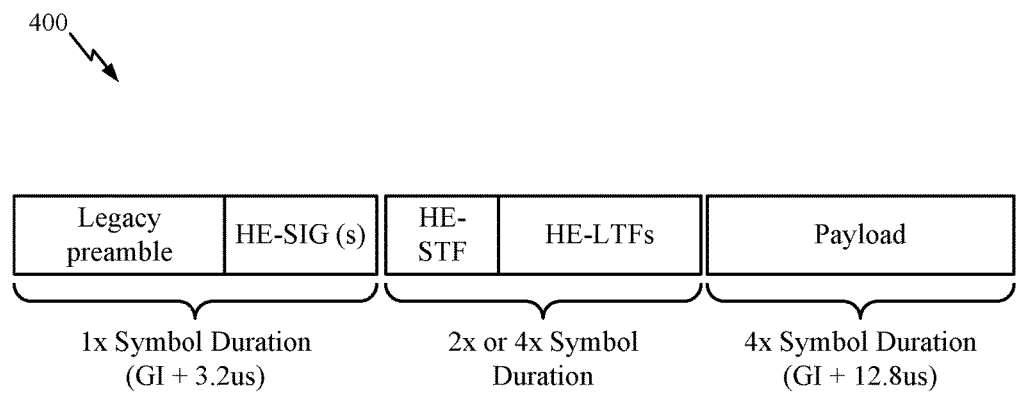
FIG. 4 illustrates an example frame structure with long training fields (LTFs), accordance with certain aspects of the present disclosure.

In some applications, longer symbol durations are used for various portions of a frame. For example, FIG. 4 shows an example packet 400, in which a longer symbol duration (e.g., 2× or 4×) is used for HE-LTFs as well as a subsequent data payload. This symbol duration is longer relative to a reference duration (e.g., a 1× symbol duration used for a legacy preamble portion and/or an HE-SIG field).

Certain standards, such as IEEE 802.11ac, support sounding procedures to obtain channel state information feedback at a transmitter (e.g., an access point) that communicates to multiple stations using beam-forming. In some cases, the access point may transmit a packet that contains LTFs that stations may use to calculate the channel. Such a packet may be referred to as a null data packet (NDP), as it may not have a data payload portion.

The feedback may include various types of information, such as compressed V-matrix information on all tones or only a sub-sampled number (less than all) of tones, an average SNR per spatial stream, singular value (S) feedback, per (spatial) stream on all or a sub-sampled number of tones. In such cases, the S feedback may be calculated as a delta from the average SNR per spatial stream. The channel feedback for a particular subcarrier (tone or set of tones) may be generated by a station by decomposing the channel matrix H as the product of an orthonormal matrix (V) and a real diagonal matrix (S), where H=USV* (U is a unitary matrix). In this case, feeding back V and S is sufficient.

The beamforming feedback matrix V (V-matrix) may be formed by a station (beamformee) based on the NDP as follows. The access point (beamformer) transmits an NDP (e.g., with $N_{STS,NDP}$ space-time streams). Based on this NDP, the station estimates the channel and, based on that channel, it determines an orthogonal matrix V.

The process of sub-sampling the feedback may be referred to as tone-grouping. With tone-grouping, one value of V or one value of S may be sent for a "group" of tones based on a "sub-sampling factor" Ng. For example, Ng=2 means that one value of V is sent for a group of 2 tones. In some cases, once Ng has been chosen for V, a sub-sampling factor for S (Ng') may be determined as Ng'=2*Ng.

In certain systems, such as proposed IEEE 802.11ax systems, the sub-carrier width during the data section of a packet may be 4 times smaller than in others (such as 802.11ac). In such cases, 4× symbol durations may be introduced to allow longer CP durations with manageable overhead.

Aspects of the present disclosure provide techniques for applying tone-grouping to such systems for sounding feedback in such systems.

Figure 5:
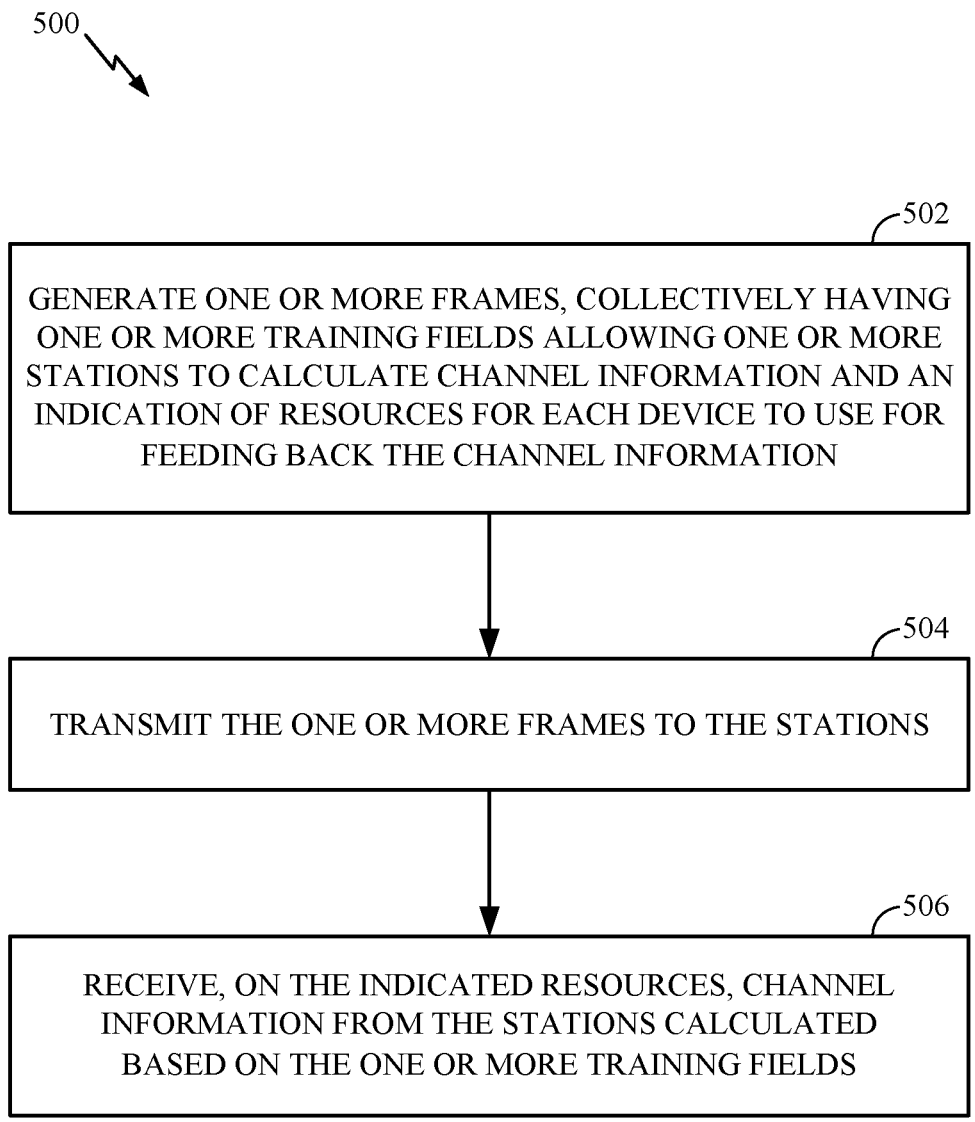
FIG. 5 illustrates a block diagram of example operations for wireless communications by a transmitting apparatus, in accordance with certain aspects of the present disclosure.

FIG. 5 illustrates a block diagram of example operations 500 for wireless communications by a transmitting apparatus, such as an access point, that allows for sounding feedback, in accordance with certain aspects of the present disclosure.

The operations 500 begin, at 502, by generating one or more frames, collectively having one or more training fields allowing one or more stations to calculate channel information and an indication of resources for each device to use for feeding back the channel information. At 504, the access point transmits the one or more frames. At 506, the access point receives, on the indicated resources, channel information from the stations calculated based on the one or more training fields.

In some cases, certain tone grouping techniques may be utilized for a sounding procedure to account for systems, such as 802.11ax, that use smaller sub-carrier width (and longer symbol durations). As an example, in some cases a sub-sampling factor for such systems may be equal to or greater than two (Ng>=2). In this case, Ng may be defined with reference to data tone width, such that Ng=4 in systems with 4× symbol duration would mean one out of four data tones is sampled. In this case, the size (amount) of CSI feedback for a given BW with Ng=4 for an 802.11ax may be approximately equal the size of CSI feedback for the same BW for Ng=1 in an 802.11ac system.

According to certain aspects, the sub-sampling factor for S feedback Ng' (also defined with reference to data tones) may be M*Ng, where M can take a value which is greater than or equal to 2.

According to certain aspects, various LTF durations may be used in packets (such as NDP packets) containing LTFs for sounding. For example, LTF duration in NDP packets may be less than or equal to 2×. In other words, in some cases, 1× duration may be sufficient from a performance viewpoint. However, in some cases, having a 2×LTF might provide consistency with data packets (that may not currently have 1×LTFs). In some cases 2×LTFs might be needed to provide accurate feedback in outdoor channels which have more frequency selectivity.

According to certain aspects, additional sampling of edge tones may be performed to augment the feedback (e.g., with different subsampling factors used in edge tone regions than in middle tone regions). As an example, with 2×LTFs, a station may feed back channel information with Ng=2 at the edges and Ng>=2 in the middle tones. In general, the edge tones may refer to tones near guard band regions and/or on both sides of DC tones. As another example, with 1×LTFs, a station may feed back at Ng=4 at the edges and Ng>=4 in the middle tones.

According to certain aspects, rather than provide feedback for the entire (PPDU) bandwidth, feedback may be based on partial BW. In this case, additional sampling may be performed, as described above for edge tones (with edge tones in this case referring to edge tones of partial BW and not PPDU BW). In some cases, additional tones around DC may not be needed, for example, unless the (partial) band is near the physical DC of the PPDU BW.

In some cases, feedback of channel quality (CQI) only may be used (for different bandwidth parts). In this manner, an AP may be able to gather channel state information and CQI information on parts of the PPDU BW. In some cases, an AP may request only CQI feedback for specified bandwidth parts.

Regardless of the type of feedback, there may be various types of reporting units, such as per resource unit (RU) based or per sub-band based. Feeding back information on a Per-RU basis may present challenges as tone locations for the same size RUs may not be consistent across different PPDU BWs. Further, due to the size of RUs, it may not be possible to divide the PPDU BW into a certain number of RUs of same size (e.g., it may not be possible to divide 80 MHz into 52 tone RU chunks).

On the other hand, with sub-band based reporting it may be possible to divide the BW into constant sized blocks (e.g., 2 MHz or 2.5 MHz wide) and an AP may be able to request the information for a particular block index. In some cases, a single CQI may be requested for multiple of these blocks (e.g., if the smallest block size if 2 MHz, an AP may request information for multiple blocks of that block size).

Regardless of the reporting unit (per RU or per sub-band), various types of information may be fed back as part of the feedback report. The types of feedback may include V matrix feedback on all or sub-set of the tones of the requested sub-band or RU, average SNR per spatial stream (e.g., as an average taken across the sub-band or RU being requested), S (singular value) feedback on all or sub-set of the tones of the requested sub-band or RU. Reported CQI may include S feedback (per spatial stream) or an average of S across all spatial streams. Reported CQI may also include MCS feedback and reported CQI may be the CQI only for a given number of Eigen modes or spatial streams. In some cases, a station may report the index of a best few sub-bands or best few RUs for the STA, for example, best in terms of channel strength (SNR), signal to interference ratio (SINR), some equivalent metric of channel quality (e.g. an average of S). In some cases, the feedback may include information about interference levels for the sub-band or RU. For example, the feedback may indicate if a certain sub-band/RU is heavily interferenced or which sub-bands/RUs have least interference.

In some cases, a feedback report may have parameters listed in a certain order. As an example, a report could list average SNR (across the entire operating band) for each stream, followed by the compressed beamforming (V) matrix for each tone. The same feedback report (or a different feedback report) could then list delta SNR for each tone, in order.

Figure 5A:
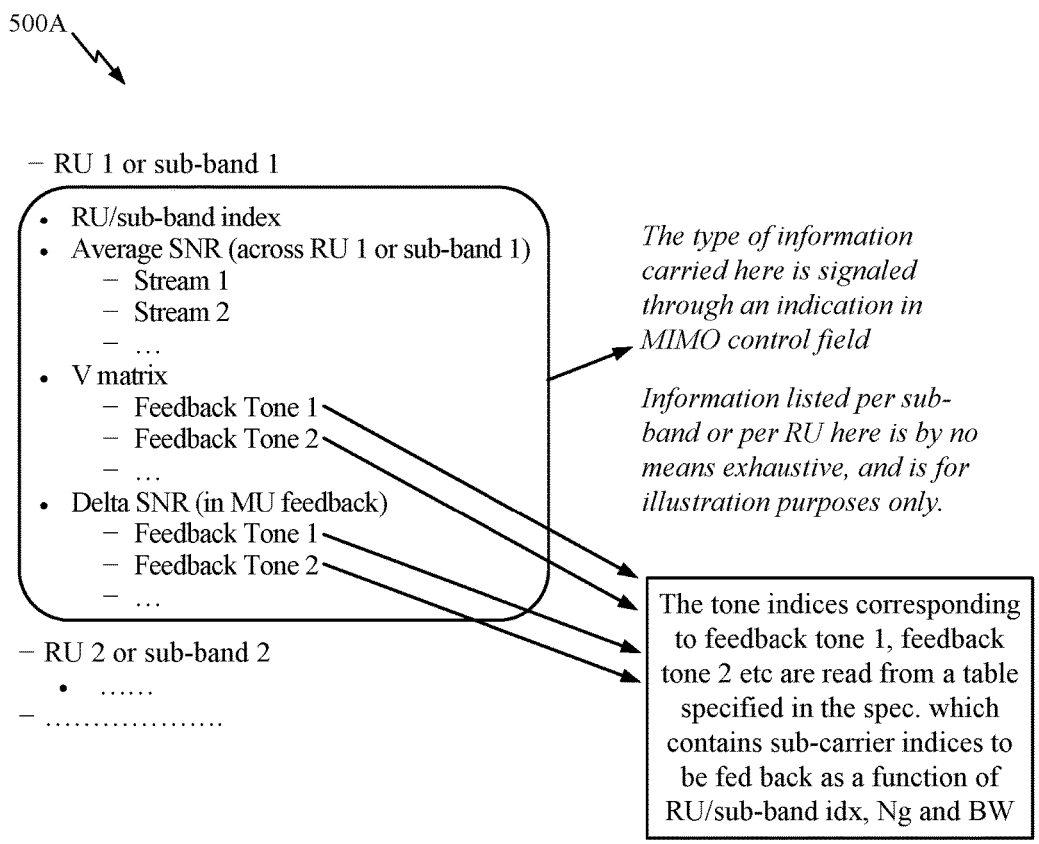
FIG. 5A illustrates an example reporting structure, in accordance with certain aspects of the present disclosure.

FIG. 5A illustrates an example of a beamforming report structure 500A that may be considered optimized for accommodating partial band feedback. As illustrated, different parameters for a same reporting unit may be grouped together. For example, for a given RU or sub-band, the report may include average SNR (across that RU or sub-band) per stream may be listed, the compressed beamforming (V) matrix for each tone (in the RU or sub-band), and delta SNR for each tone (in the RU or sub-band). Of course, the type of information listed is illustrative only and other types of information or combination of information may be included. In some cases, the particular type of information carried in the report may be signaled (e.g., through an indication in a MIMO control field). In FIG. 5A, the tone indices (e.g., corresponding to feedback tone 1, feedback tone 2, etc.) may be read from a table which may contain sub-carrier indices to be fed back as a function of various parameters (such as RU/sub-band index, Ng and BW).

Figure 6:
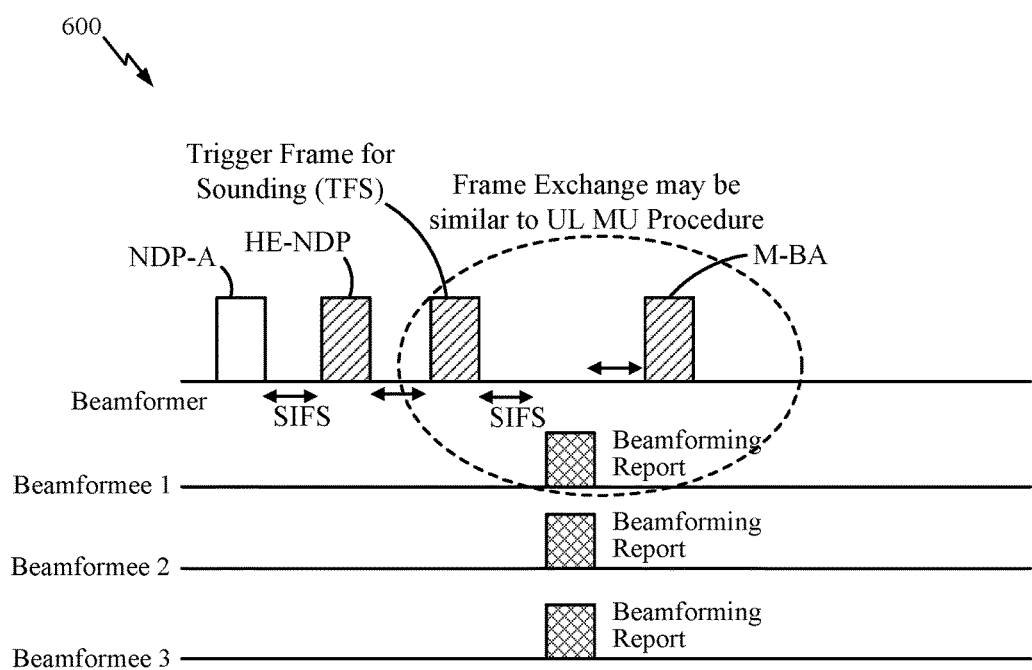
FIG. 6 illustrates an example sounding frame exchange, in accordance with aspects of the present disclosure.

FIG. 6 illustrates an example sounding frame exchange. 600e, in accordance with aspects of the present disclosure. The illustrated exchange may be used, for example, when an AP is communicating with STAs are all of a same type (e.g., all 802.11ax) and capable of receiving MU sounding packets. As illustrated, the beamformer (e.g., AP) may begin by sending an NDP announcement (NDP-A), followed by an HE-NDP. The HE-NDP may include LTFs, as described above, that the stations (Beamformees 1-3) can use to calculate channel information. The AP may also send a trigger frame for sounding (TFS) that provides an indication of resources allocated to the stations for sending their beamforming reports. After receiving the reports from the stations, the AP may send a multi-user Block ACK.

Figure 7:
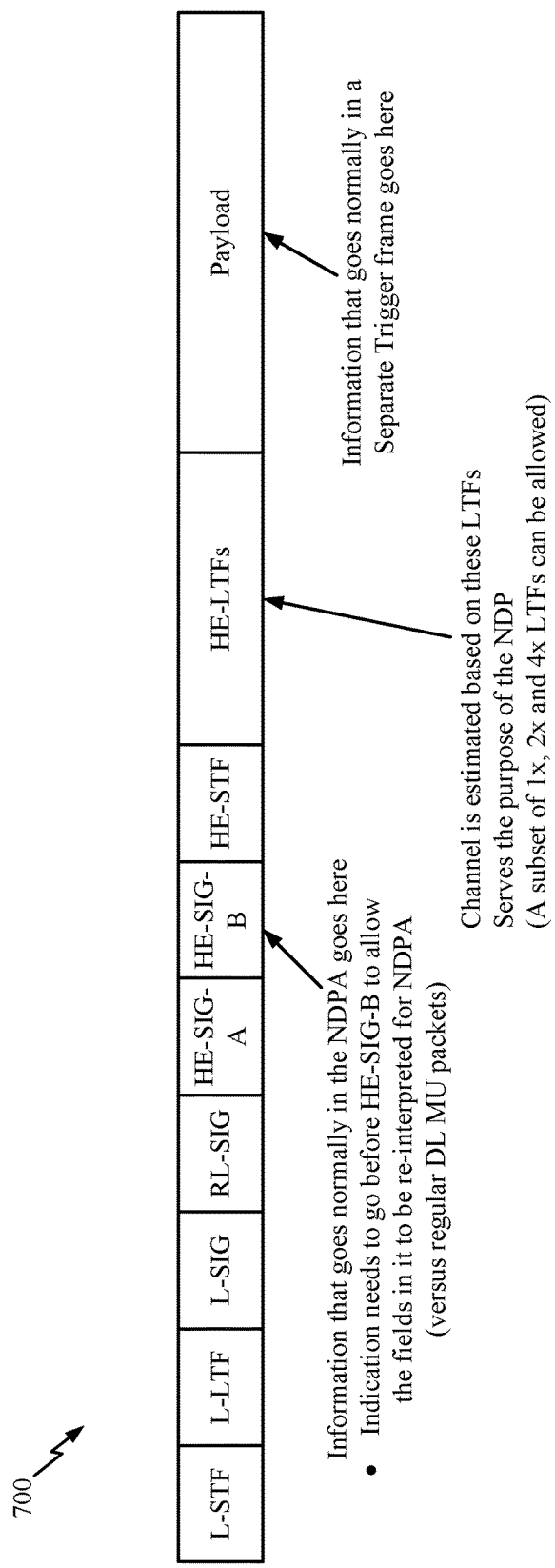
FIG. 7 illustrates an example optimized sounding frame structure, in accordance with aspects of the present disclosure.

FIG. 7 illustrates an example frame format 700 in which some of the information transmitted in different frames shown in FIG. 6 may be combined. As illustrated, the format 700 may allow the NDP-A and HE-NDP may be combined into a single frame. As illustrated, information from the NDPA may be included in the HE-SIGB field. In this case, the frame may include an indication (early enough) that the fields of the HE-SIGB are to be re-interpreted for NDPA (as opposed to regular DL MU packets). The station may calculate the channel information based HE-LTFs (e.g., these may serve the same purpose as LTFs in the NDP (and again, a subset of 1×, 2×, and 4× LTFs may be allowed). As illustrated, the trigger frame (or information normally included in the trigger frame) may also be included in the frame, for example, in the payload.

Relative to the exchange shown in FIG. 6, the format 700 shown in FIG. 7 may save substantial overhead (e.g., by reducing preambles, inter-frame spacings, and the like). Placing the trigger information in the payload may give the stations enough time after HE-LTFs to prepare feedback packet. In some cases, the number of LTFs in the packet may correspond to a higher number of spatial streams than the streams in the payload section. In some cases, placing a MAC trigger frame information in the payload may be a default mode of operation (although a separate MAC trigger frame may also be sent instead).

Figure 8:
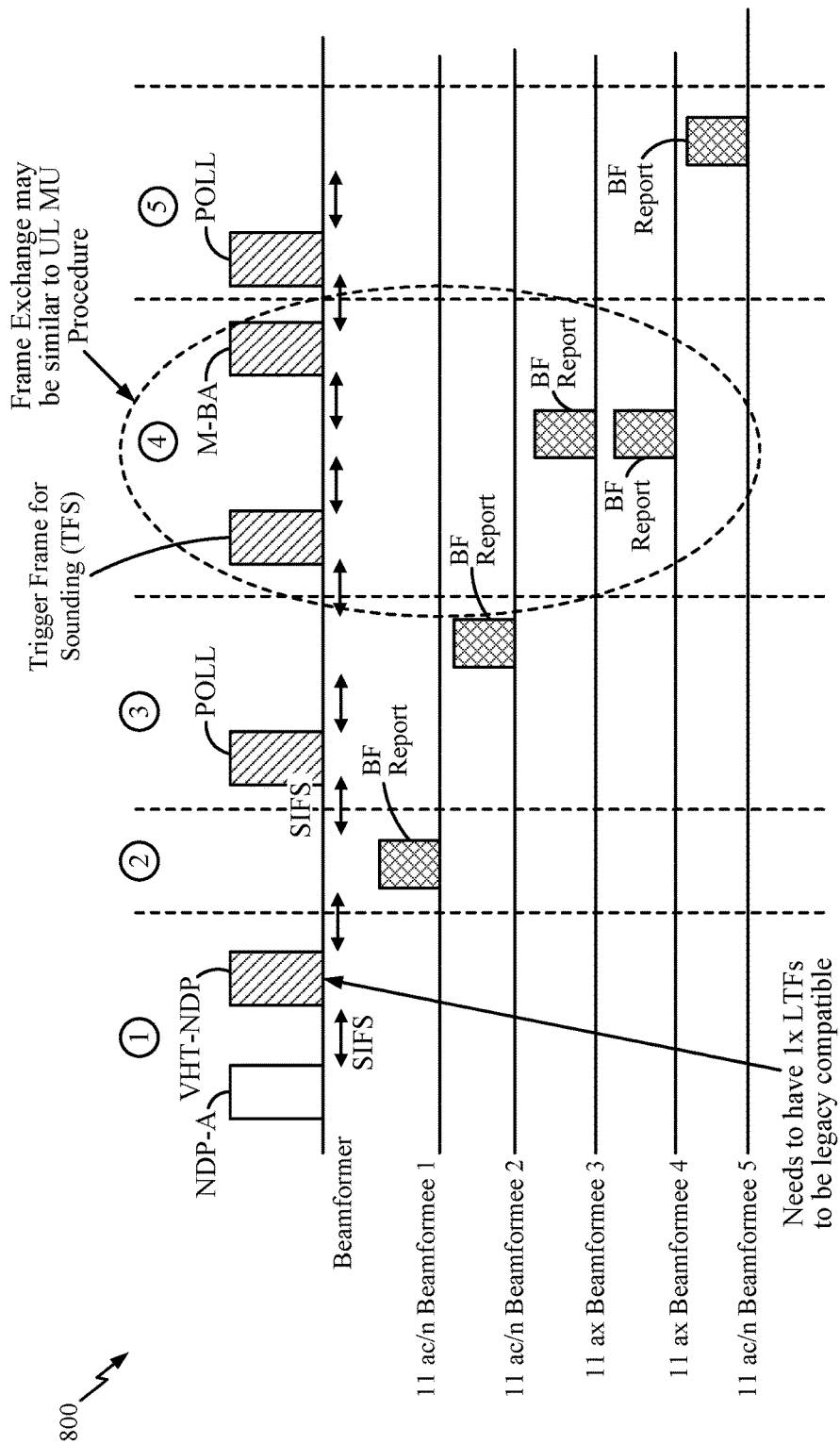
FIG. 8 illustrates an example sounding frame exchange, in accordance with aspects of the present disclosure.

One disadvantage to the format 700 shown in FIG. 7 is that it may not support certain devices (e.g., "legacy" 802.11ac/n devices). However, FIG. 8 illustrates an example sounding frame exchange 800 that may support legacy and enhanced devices, in accordance with aspects of the present disclosure. In other words, in the illustrated sequence, the NDPA and NDP may be backwards compatible.

The exchange 800 shown in FIG. 8 is divided into different sections (1 through 5), and different embodiments of the present disclosure may be based on different combinations of these sections, as follows. Section 1 may be present in many embodiments. Section 4 may be present in embodiments which includes at-least two 11ax STAs. As illustrated, section 4 may be similar to the UL MU procedure. Sections 3 and 5 may also involve more than one beamformee (e.g., more than one pair of poll and "BF report"). If a legacy STA is the first STA in the NDPA, an exchange may involve the following combinations: Sections 1, 2, 3, 4, 5; Sections 1, 2, 4, 5; Sections 1, 2, 3, 4; or Sections 1, 2, 4. If legacy STAs go after the enhanced (e.g., 11ax) STAs, the combination of Sections 1, 4, and 5 may be supported.

In some cases, multiple sections like section 4 may be present, for example, with each section collecting feedback for a different group of (11ax) STAs. In some cases, the multiple sections may be separated by sections like Section 5.

As noted above, the format of an LTF may be carefully designed for a sounding packet. For example, for the separate NDP case, a subset of 1×, 2× and 4× LTFs may be allowed. A 1×LTF based NDP may be the same as a previous (e.g. 11ac) NDP. 2× and 4×LTFs may be used for outdoor use-cases and, in some cases, may use the same LTF sequences as in regular data packets or may use different LTF sequences compared to regular data packets (e.g., with some tones nulled out). Further, as noted above, Ng=2 or 4 may be used in the middle tones while Ng=1 or 2 is used at the edges.

Figure 9:
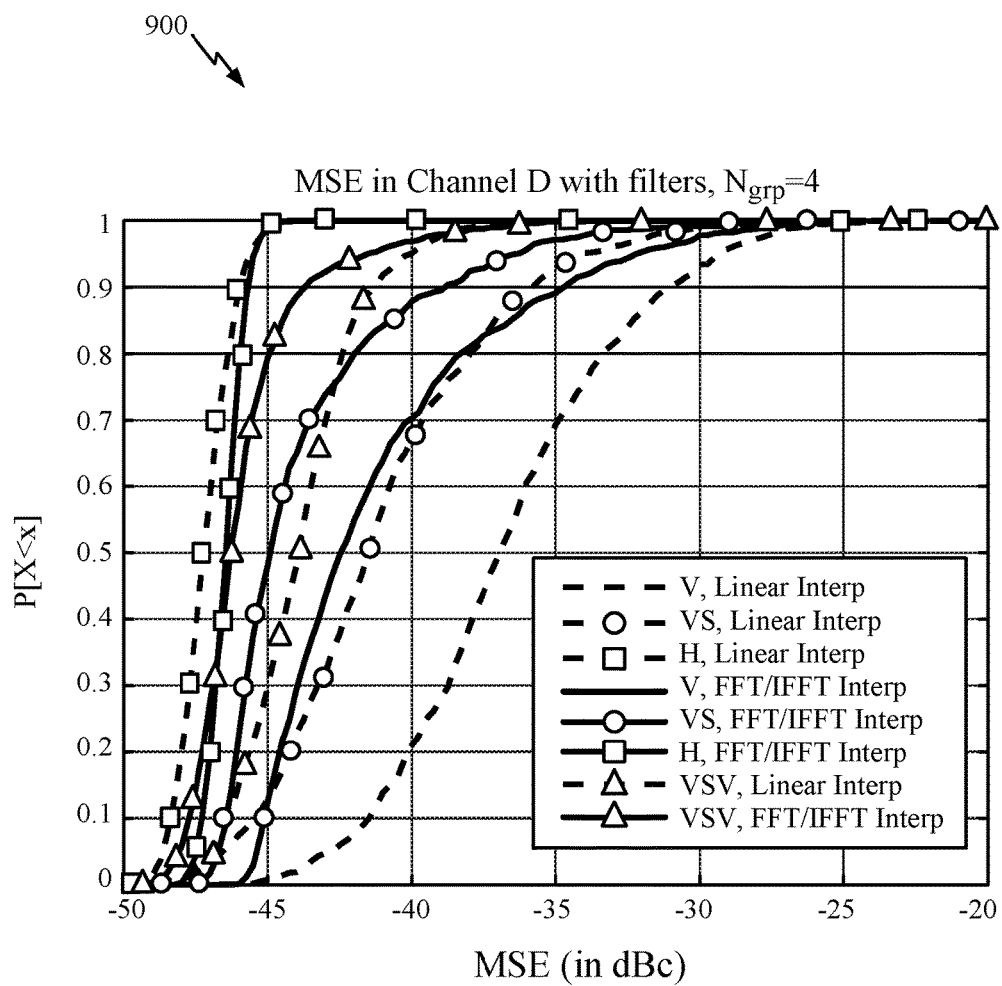
FIG. 9 illustrates example performance results using sounding procedures, in accordance with aspects of the present disclosure.
Figure 10:
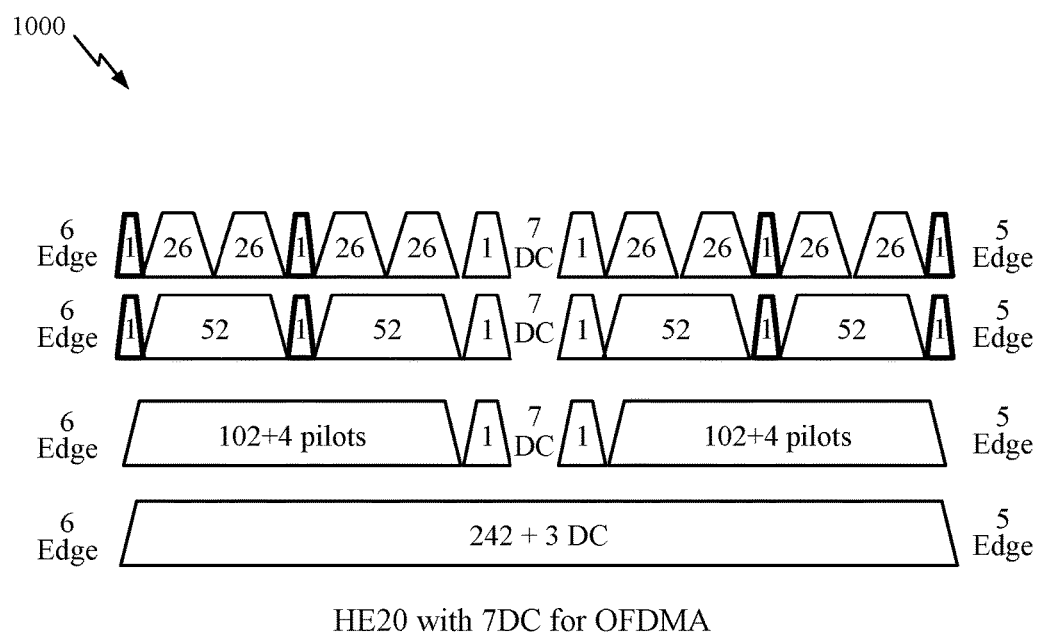
FIGS. 10-13 illustrate example tone plans, in accordance with aspects of the present disclosure.
Figure 11:
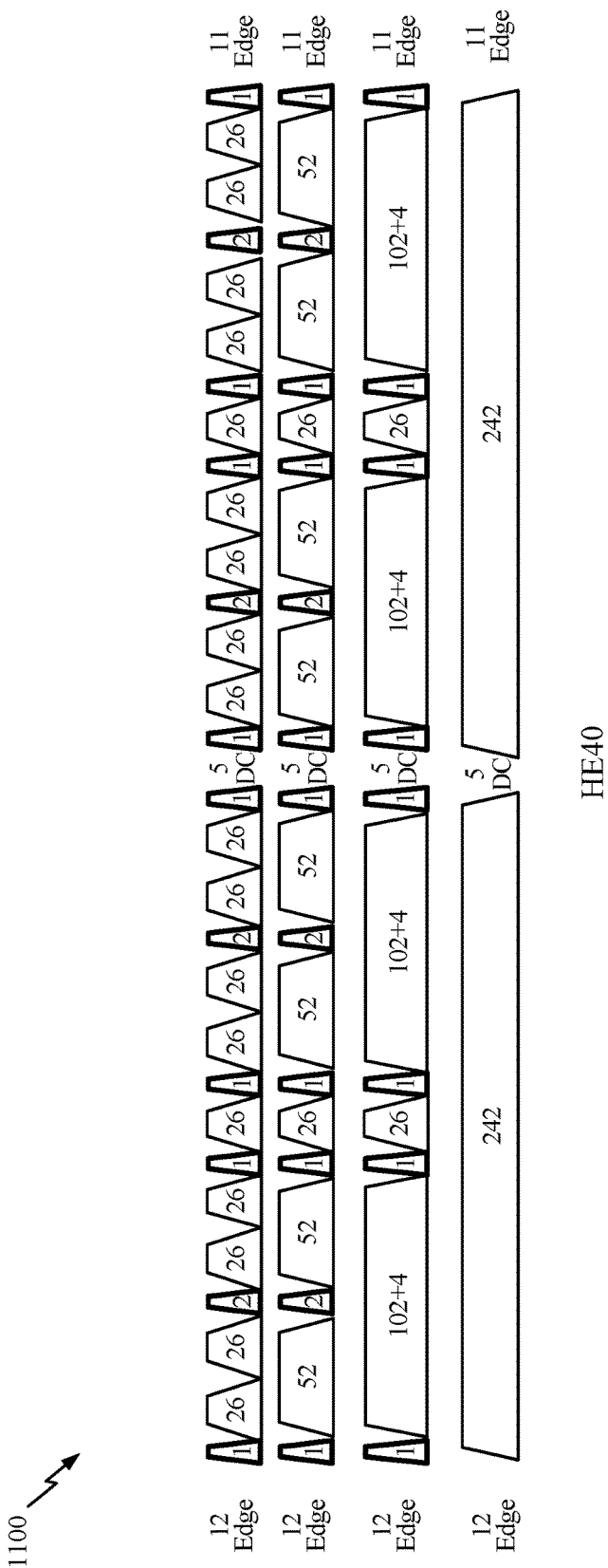
Figure 12:
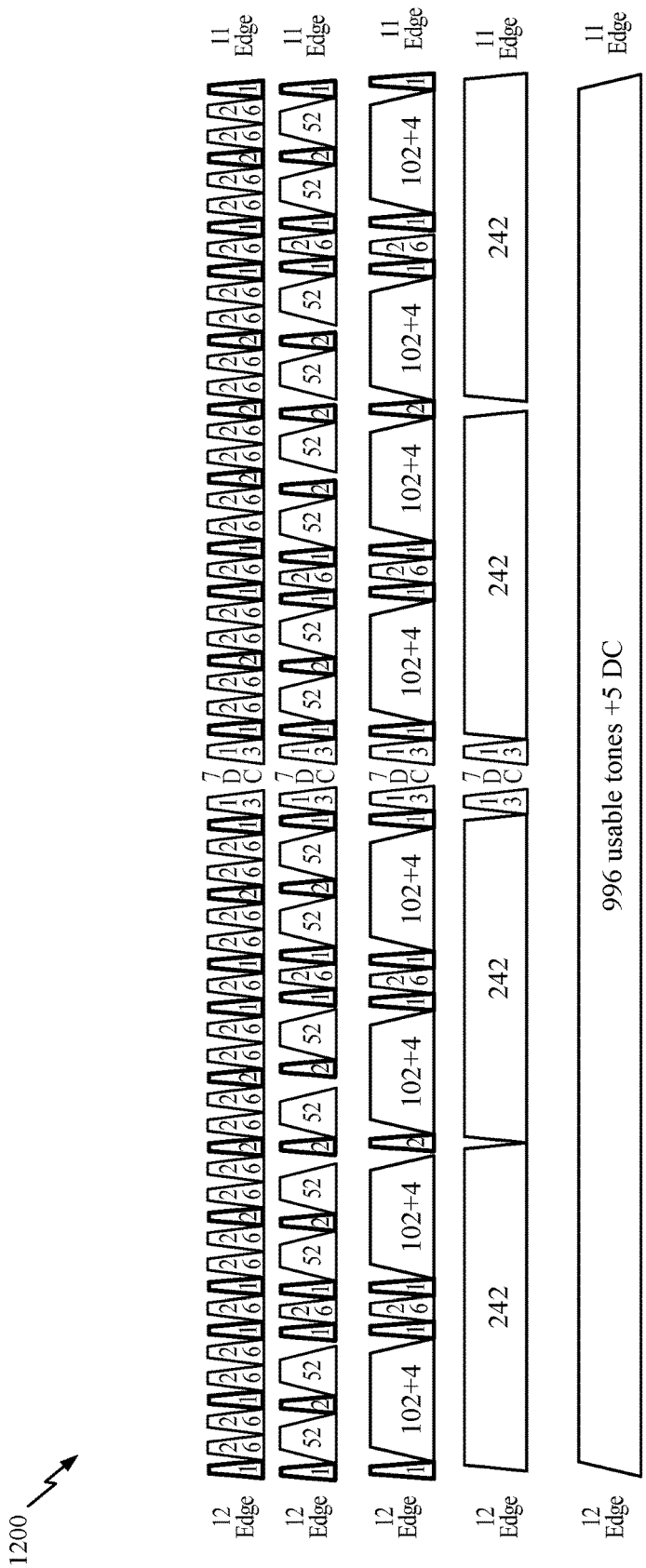
Figure 13:
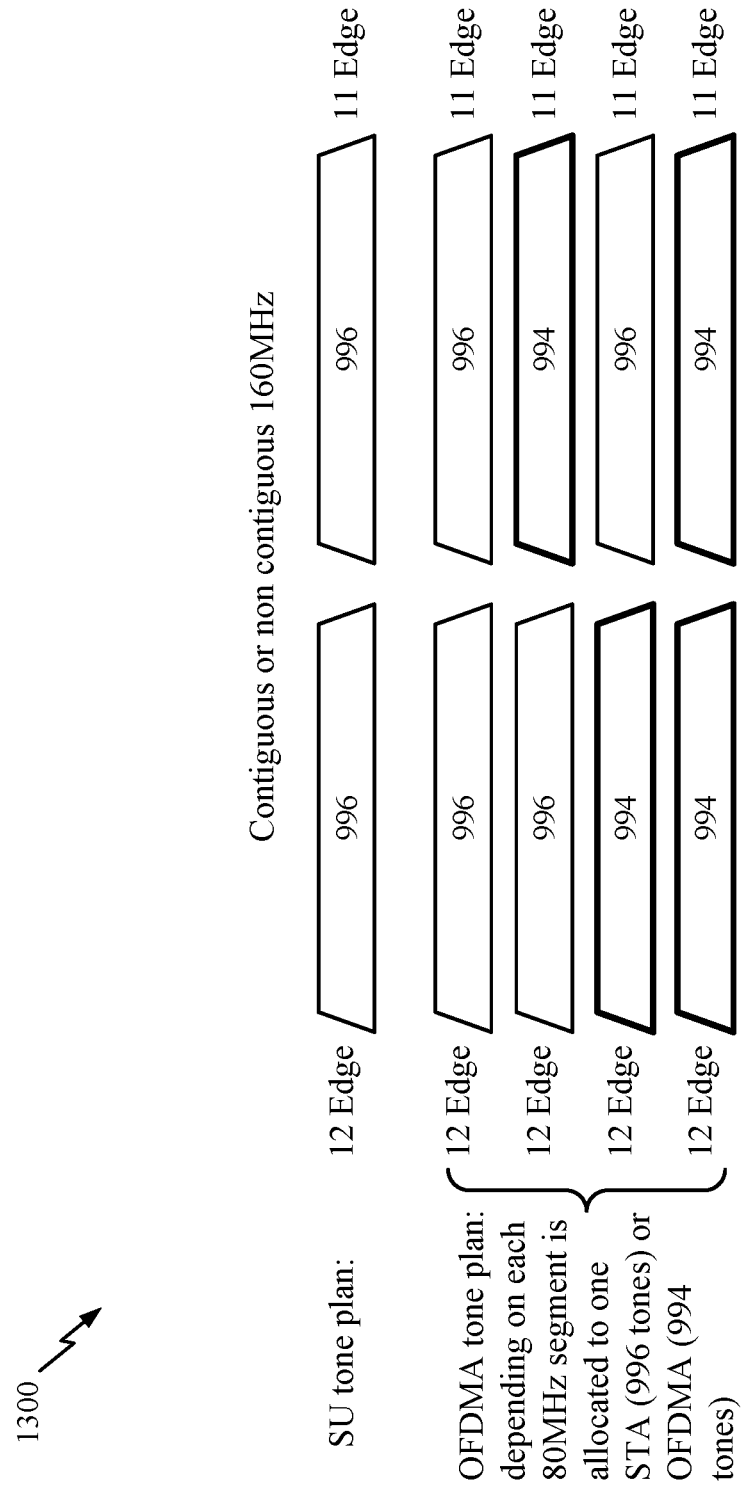

FIG. 9 illustrates a graph 900 showing example performance results based on simulations using sounding procedures, in accordance with aspects of the present disclosure. The simulation results show a probability (on the Y-axis) of achieving the mean square error (MSE) shown in the X-axis. V matrix has been smoothed to remove discontinuities, VSV in legend below stands for VS2V*, tone augmentation as described (around band edges and DC) is used for FFT/IFFT interpolation at AP, and assumes Tx/Rx filters, modeled as 10th-order Butterworth filter to model lengthening of impulse response and the resulting increased frequency selectivity. Solid curves assume edge tones are augmented at Ng=1, and other tones are sent at Ng=4 (e.g., Ng=1 augmentation at edges may only be possible with 4×LTFs). Dashed curves assume Ng=4 feedback everywhere and simple linear interpolation, with a lower bound of Ng=4 performance for 1×, 2× and 4×LTFs in NDP. Bounds of Ng=4 with 1×LTF and 2×LTF in NDP are as follows. With 1×LTFs, edge tones may not be augmented, so linear interpretation may be performed at edges, while more complex (e.g., FFT/IFFT) interpolation may be performed in the middle, with performance expected to be between solid and dashed lines. With 2×LTFs, edge tones may be augmented at Ng=2. In this case, linear interpretation may also be performed at the edges, with more complex interpolation in the middle. Again, performance may be expected to be between solid and dashed lines (e.g., better than 1×LTFs, due to possibility of better edge resolution).

The particular format of the sounding frames described herein (e.g., location of tones for various fields) may depend on a particular tone plan utilized and different tone plans may correspond to different BW sizes and different RU sizes.

For example, FIGS. 10, 11, 12, and 13 illustrate example tone plans 1000, 1100, 1200, and 1300 for 20 MHz, 40 MHz 80 MHz, and 160 MHz OFDMA PPDUs, respectively. As illustrated, exact locations of leftover tones (e.g., with 0 energy) when using 26, 52 or 106-tone RUs within a 242 tone unit are shown as shaded. As illustrated, possible RU locations in a 40 MHz OFDMA PPDU may be roughly equivalent to two replicas of possible RU locations in the 20 MHz OFDMA PPDU. Similarly, possible RU locations in an 80 MHz OFDMA PPDU may be roughly equivalent to two replicas of the possible RU locations in a 40 MHz OFDMA PPDU plus one central 26-tone. As illustrated, the 160 MHz tone plan 1300 of FIG. 13 may consist of two 80 MHz tone plans.

Example Sounding Procedure Enhancements

Using different types of LTFs in beam formed packets may provide flexibility for feedback generation and reporting, but may also create certain challenges. For example, for beamformed packets with a 4× data portion and 1× or 2×LTFs, there could potentially be a mismatch between the estimated channel (calculated at a receiving station) and a beamforming (BF) matrix calculated at a transmitting access point.

Figure 14:
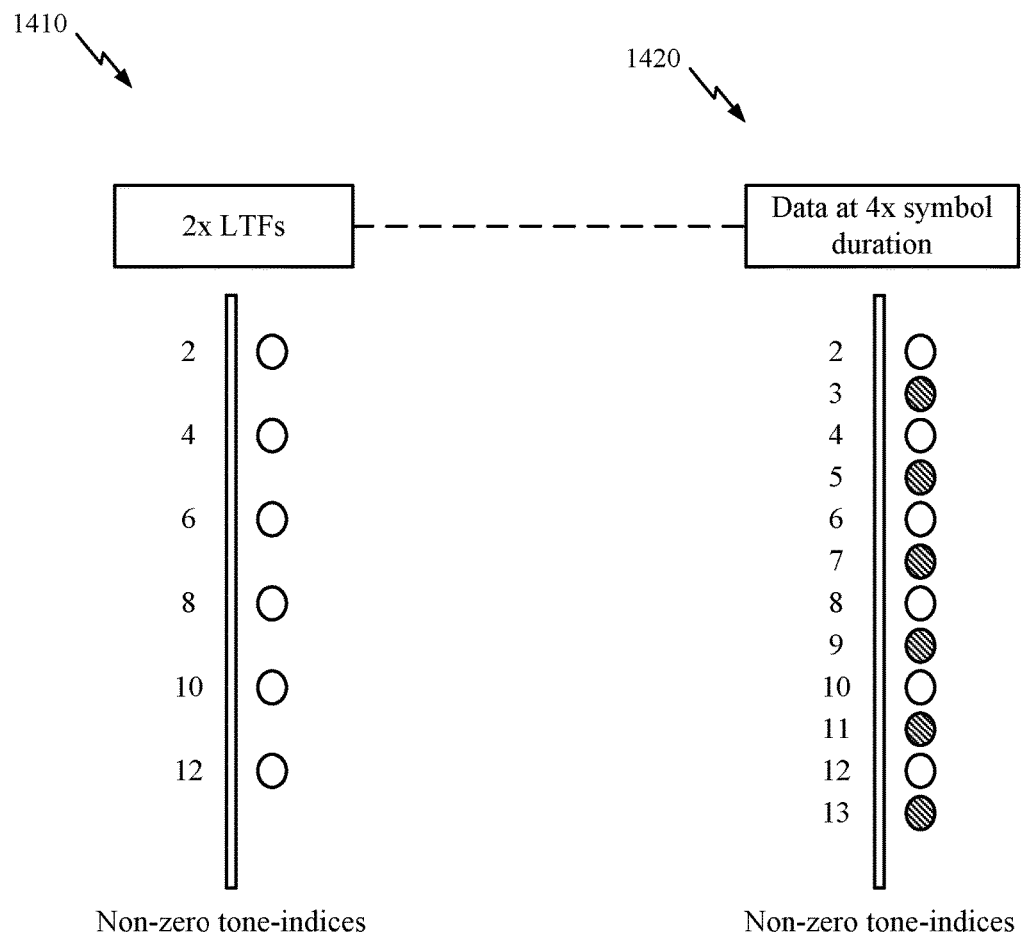
FIG. 14 illustrates an example tone plan for a training field and a data portion of a frame, in accordance with aspects of the present disclosure.

In other words, as illustrated in FIG. 14, in such transmissions the channel estimate may not be available on all the data tones (tones populated in the data portion) as the LTFs 1410 can be 1× or 2× (populating only every 4 or every other tone relative to the data portion). In FIG. 14, shaded tones in the 4× data portion correspond to tones (every other tone) that are not populated in the 2×LTF. For those tones, the station may have to perform interpolation to estimate the channel for the beamformed transmission. Similarly, if the station provided feedback based on tone grouping (e.g., Ng>=2), then the AP may have to perform interpolation to calculate precoder values (for the beamforming matrix) for those same tones.

Aspects of the present disclosure provide a mechanism that may help ensure continuity between the interpolation applied at the AP (for precoding the beamformed data portion for those tones) and interpolation applied at the station (to estimate the channel for those tones). In some cases, one or more rules may be applied at both the AP and station to ensure such continuity. For example, one rule may be that the precoder on the orange tones is calculated based on an average of the (precoder for the) two neighboring blue tones. The station may then apply this same interpolation when calculating a channel estimate for those same tones based on the 2×LTF (and then use the channel estimate to process the 4× data portion).

Figure 15:
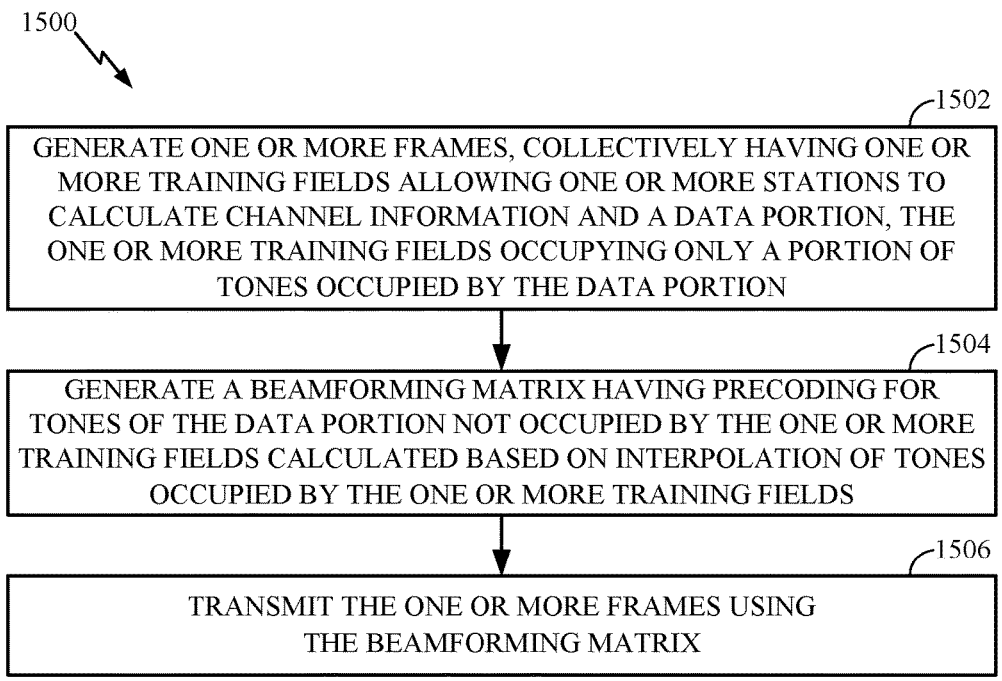
FIG. 15 illustrates example operations that may be performed by an access point, in accordance with aspects of the present disclosure.

FIG. 15 illustrates example operations 1500 by an access point, for example, to perform interpolation for beamforming in accordance with aspects of the present disclosure.

The operations 1500 begin, at 1502, by generating one or more frames, collectively having one or more training fields allowing one or more stations to calculate channel information and a data portion, the one or more training fields occupying only a portion of tones occupied by the data portion. At 1504, the AP generates a beamforming matrix having precoding for tones of the data portion not occupied by the one or more training fields calculated based on interpolation of tones occupied by the one or more training fields. At 1506, the AP transmits the one or more frames using the beamforming matrix.

Figure 16:
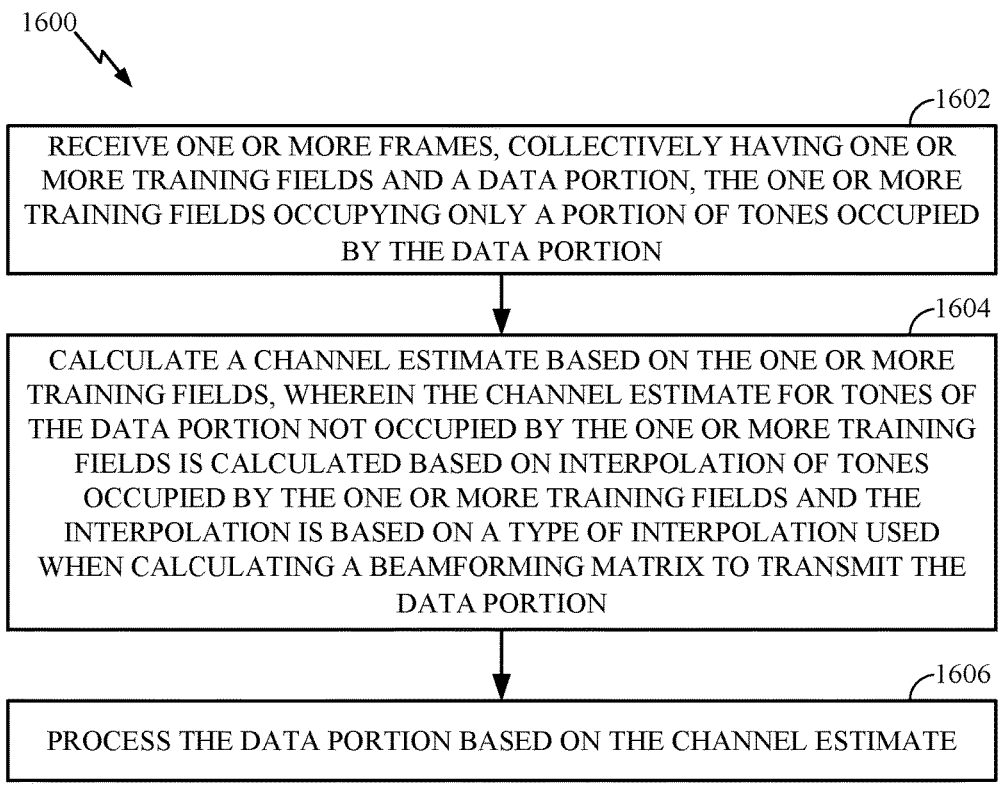
FIG. 16 illustrates example operations that may be performed by a station, in accordance with aspects of the present disclosure.

FIG. 16 illustrates example operations by 1600 a station, for example, to perform interpolation for channel estimation in accordance with aspects of the present disclosure. In other words, operations 1600 may be performed by a station to perform channel estimation for a beamformed transmission sent from an AP according to operations 1500.

The operations 1600 begin, at 1602, by receiving one or more frames, collectively having one or more training fields and a data portion, the one or more training fields occupying only a portion of tones occupied by the data portion. At 1604, the station calculates a channel estimate based on the one or more training fields, wherein the channel estimate for tones of the data portion not occupied by the one or more training fields is calculated based on interpolation of tones occupied by the one or more training fields and the interpolation is based on a type of interpolation used when calculating a beamforming matrix to transmit the data portion. At 1606, the station processes the data portion based on the channel estimate.

As noted above, in some cases, a sounding protocol may involve sending sounding frames that are specific to one type of device. For example, this approach may be a default mode of operation when sounding a group where all the STAs are capable of communicating via a certain standard, such as 802.11ax (which may be referred to as "11ax capable" or simply 11ax STAs). In this case, not combining the trigger frame with other frames, although may not provide backward compatibility, may have a benefit of preserving the similarity with regular uplink multi-user (UL MU) protocols.

On the other hand, a sounding protocol that is backward compatible (e.g., with at least a portion decodable by different types of stations) may have a benefit of improved efficiency for sounding feedback of 11ax STAs and saving the duplication of NDPA and NDP frames. This may also be beneficial to accommodate the likely scenario of a system having a mix of different types of stations (e.g., a mix of 11ac and 11ax STAs). While backwards compatibility with an announcement (e.g., NDPA) and trigger frame (e.g., NDP) may be possible, it may be a challenge for different types of LTFs (e.g., 1×LTF in VHT-NDP) to adequately support 4× beamformed data (due to extrapolation issues). In some cases, a VHT-NDP frame may be modified to add more edge tones in the LTF without impacting legacy devices.

Figure 17:
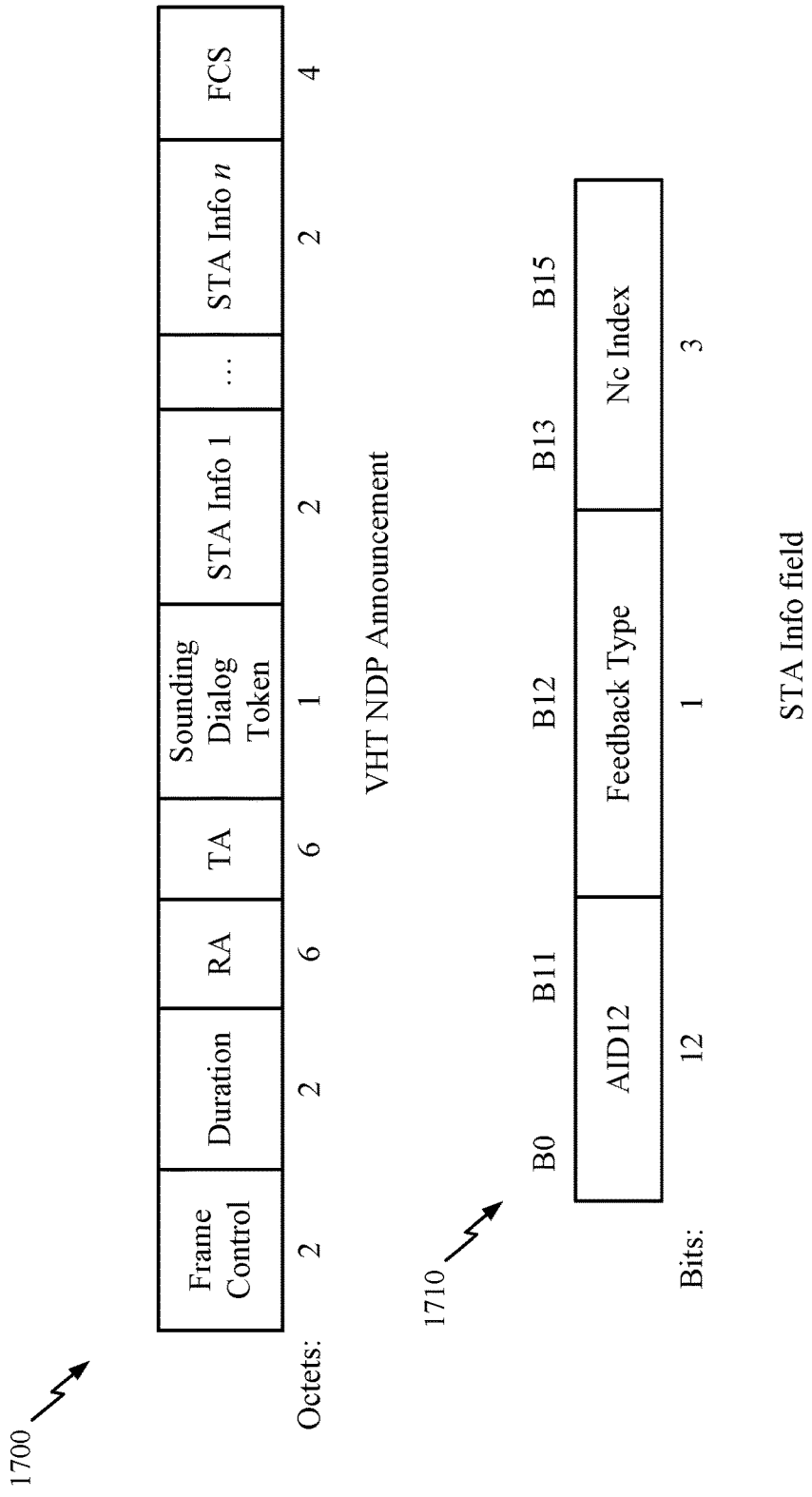
FIG. 17 illustrates an example announcement frame and corresponding station information field.

FIG. 17 illustrates an example announcement (NDPA) frame format 1700 and corresponding station information field 1710. As illustrated, the NDPA frame may include STA information fields with feedback information (e.g., Feedback type and Nc Index) for stations identified by an association ID (AID).

In some cases, the content of an NDPA frame may be modified (e.g., to include additional information) for 11ax capable devices. In such cases, backward compatibility may still be achieved by sending such a modified NDPA frame with a "legacy" physical (PHY) header (e.g., decodable by legacy devices) or it could be sent using an 11ax PHY header.

There may be various reasons to modify the content of an NDPA frame for 11ax devices. For example, such modification may allow for an expanded amount of information to be provided in STA information fields, such as different types of feedback (e.g. CQI only feedback or partial band feedback). As an example, the STA info field may be expanded to carry the following info: subcarrier group length Ng, a RU/sub-band index, a parameter indicating a Type (s) of information being requested (e.g., CSI feedback, CQI feedback, Best or top few sub-band/RU, Heavily interferenced or worst few sub-bands and RUs). As noted above, in some cases, trigger information could also be included in an NDP-A. In some cases, the NDPA may carry additional information about the NDP, such as an NDP-type indication (e.g., VHT NDP vs HE-NDP or an LTF symbol duration used in the HE-NDP).

Figure 18:
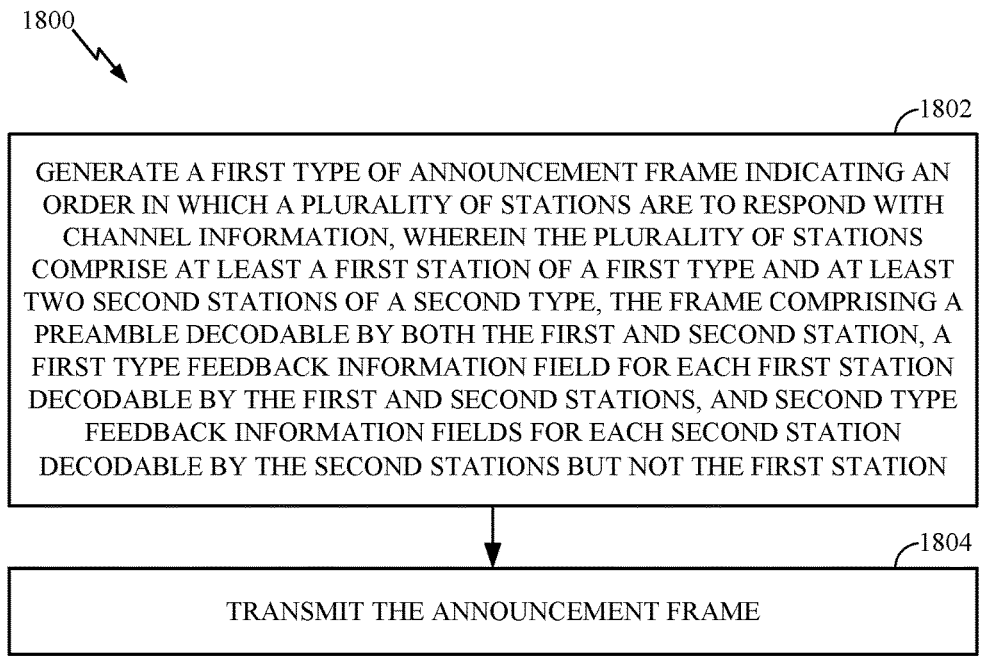
FIG. 18 illustrates example operations that may be performed by an access point, in accordance with aspects of the present disclosure.

FIG. 18 illustrates example operations 1800 that may be performed by an access point for generating an announcement frame with additional station information, but that is still backward compatible, in accordance with aspects of the present disclosure.

The operations 1800 begin, at 1802, by generating a first type of announcement frame indicating an order in which a plurality of stations are to respond with channel information, wherein the plurality of stations comprise at least a first station of a first type and at least two second stations of a second type, the frame comprising a preamble decodable by both the first and second station, a first type feedback information field for each first station decodable by the first and second stations, and second type feedback information fields for each second station decodable by the second stations but not the first station. At 1804, the AP transmits the announcement frame.

Figure 19:
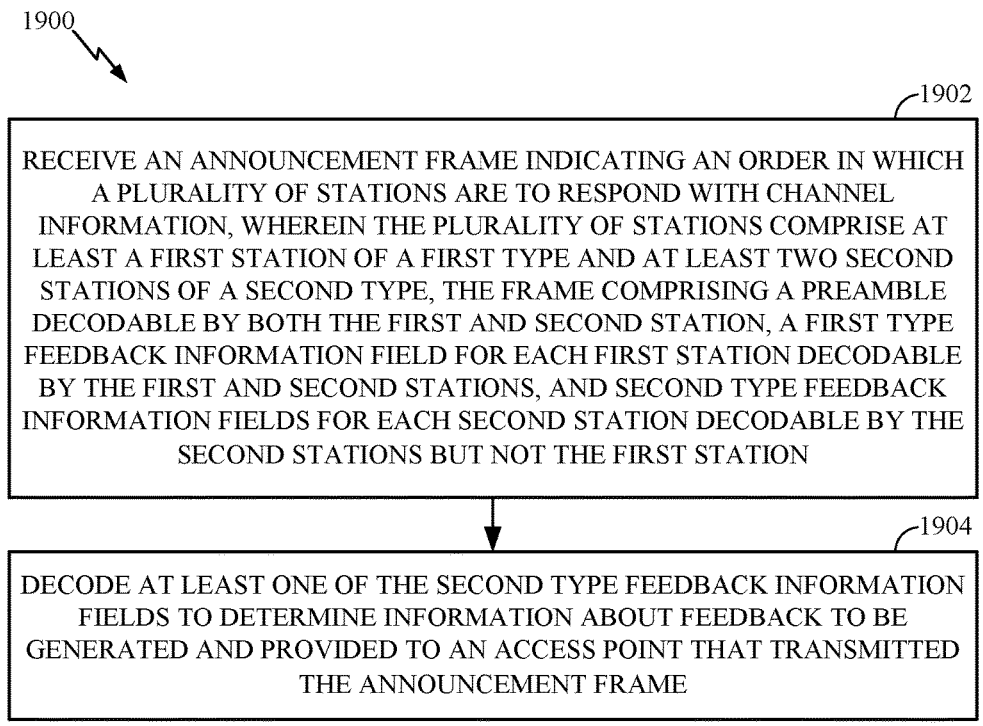
FIG. 19 illustrates example operations that may be performed by a station, in accordance with aspects of the present disclosure.

FIG. 19 illustrates example operations by 1900 a station, for example, to process an announcement frame sent from an AP according to operations 1800.

The operations 1900 begin, at 1902, by receiving an announcement frame indicating an order in which a plurality of stations are to respond with channel information, wherein the plurality of stations comprise at least a first station of a first type and at least two second stations of a second type, the frame comprising a preamble decodable by both the first and second station, a first type feedback information field for each first station decodable by the first and second stations, and second type feedback information fields for each second station decodable by the second stations but not the first station. At 1904, the station decoding at least one of the second type feedback information fields to determine information about feedback to be generated and provided to an access point that transmitted the announcement frame.

Figure 20:
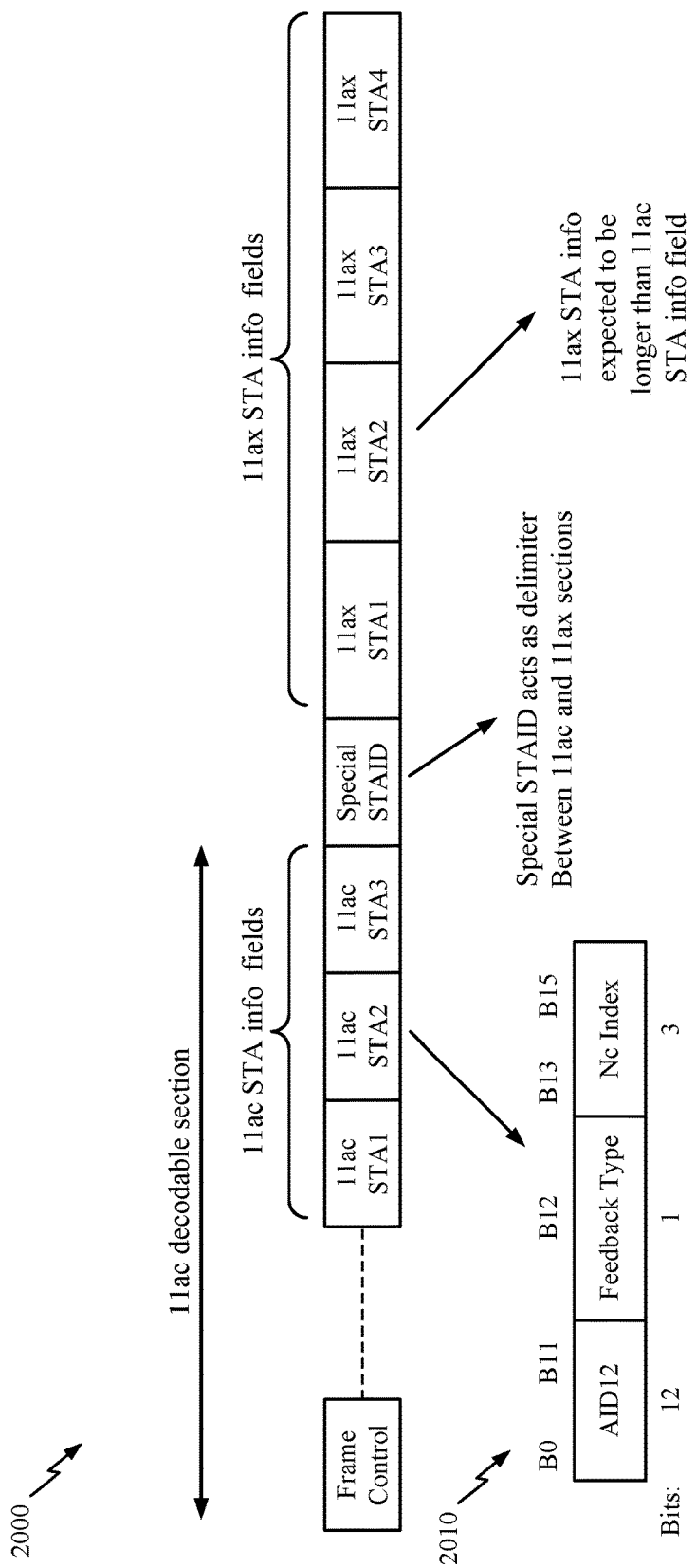
FIGS. 20 and 21 illustrate an example announcement frame and training frame, in accordance with aspects of the present disclosure.

FIG. 20 illustrates an example of an NDPA frame format 2000 that may include extended station information fields 2010 (for 11ax devices) and still be backward compatible (e.g., decodable by 11ac devices). As illustrated, the NDPA frame may have a section (e.g., including a PHY header and a first set of station information fields) decodable by 11ac STAs. In some cases, the frame may include an indication of when the 11ac portion is ending and the (extended) STA info of 11ax STAs (e.g., with different size of STA info field) is starting. As illustrated, this may be achieved by including a special AID acting as a delimiter between the 11ac portions and the 11ax portions (which may be longer than the 11ac portions due to additional/extended information described above).

As described herein, options exist for providing modified content (in STA information fields) and such frames may be transmitted with legacy (11ac) PHY portions or flax PHY portions. Sending an NDPA using 11ax PHY may be beneficial, for example, to make sure the NDPA allows for sounding outdoor STAs (due to longer CP in 11ax PHY). On the other hand, sending an NDPA using an 11ac PHY may achieve sounding of both 11ac and 11ax devices using the same procedure.

As described above, one option is to send an NDPA with unmodified (same as 11ac) content of the NDPA, which basically means trigger frame for sounding has to carry the additional information about feedback type with. Unfortunately, the lack of extended information may not allow (flax) devices to know about the type/details of feedback being requested till the trigger frame arrives.

There may also be various 11ax formats to use for sending a modified NDPA (HE-NDPA). For example, the PHY portion may include a multi-user (MU) format within a SIG-B field. As an alternative, the PHY portion may include an SU format without an HE-SIGB, which may result in a smaller preamble.

In summary, one option for sending NDPA information is to use the same NDPA content as VHT and sending such an NDPA with an 11ac PHY. While this option may provide backwards compatibility, it may not be able to convey new types of feedback in NDPA. Thus, a trigger frame may need to carry this information and, due to the shorter CP length relative to 11ax PHY, such an NDPA may not be ideal for outdoor channels. A second option is for NDPA content modified for 11ax devices, with the NDPA sent using 11ac PHY. This option may be allowed for indoor environments, allows for sounding of 11ax and 11ac devices together while not requiring a new trigger.

A third option is to send an NDPA with content modified for 11ax devices, but using an 11ax PHY. This option may be suitable for outdoor devices and also allows the conveyance of new feedback types for 11ax, albeit at the cost of a loss of backwards compatibility and a slightly longer preamble. In some cases, this third option may be used as a default mode, while sounding to a group of 11ax STAs. If 11ac stations are detected, one of the other options may be used to allow for sounding the 11ax and 11ac STAs together in a backward compatible way.

In some cases, a modified NDP frame (HE-NDP) frame may be used, for example, for outdoor STAs. The use of VHT-NDP (or a backward compatible HE-NDP) may be used to enable the sounding protocol described above with reference to FIG. 8. An HE-NDP may be suitable for an outdoor use-case.

Figure 21:
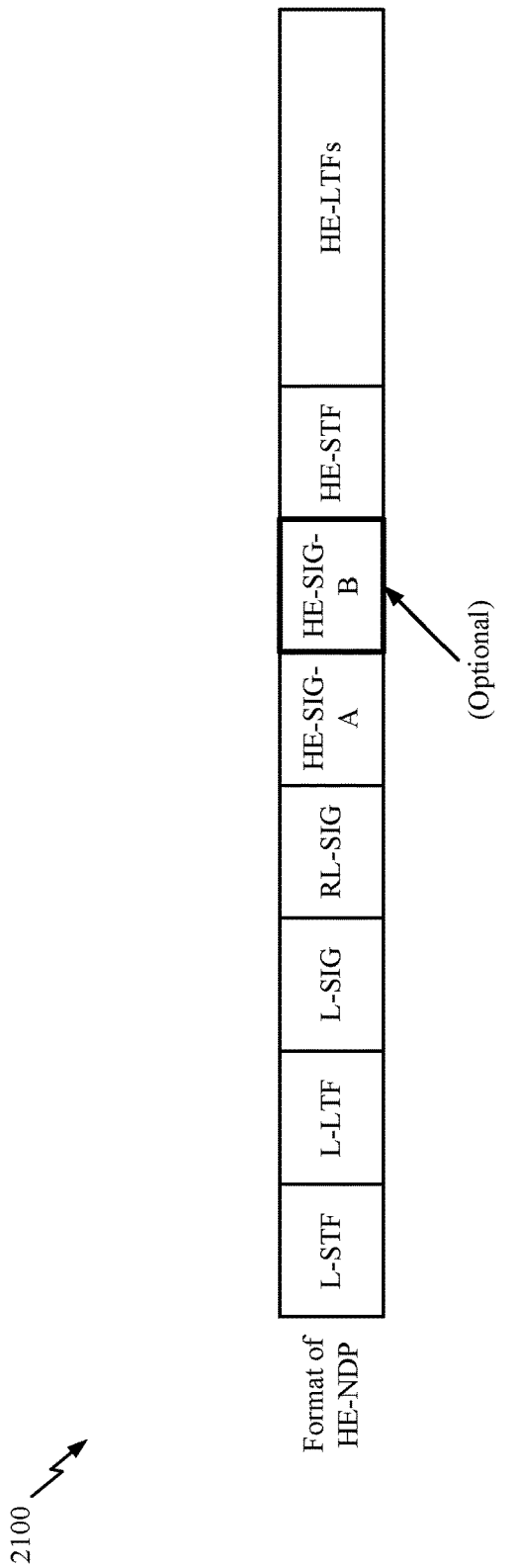

FIG. 21 illustrates an example HE-NDP frame format 2100. Such a frame format may allow multiple HE-LTF durations. In some cases, a 1×LTF may be used, but 2×LTFs may be more suitable for outdoor channels. As illustrated in FIG. 21, an HE-SIG-B could be used, but is optional. In some cases, an SU frame format may be used for the HE-NDP. If a SIG-B is not included, this NDP may be very similar in size to a VHT-NDP frame format. In some cases, the combination of length field in L-SIG and Nsts in SIG-A may be used to identify that this is an NDP frame (designed to trigger sounding). In some cases, the LTF duration of NDP may be specified in an HE-SIG-A field. In some cases, a bit may be re-interpreted to differentiate between 2× and 4×LTFs in data packets to signify the choice between 1× and 2×LTFs.

As noted above, in some cases there may be extrapolation issues when using LTFs of different sizes in an NDP. For example, for an 11ac 20 MHz, the LTF populates tones from −28 to −1 and from 1 to 28 in steps of 1 tone. In the 4× domain, this translates to tones from −112 to −4 and from 4 to 112 in steps of 4 tones, while data transmissions happen on all tones from −122 to −2 and 2 to 122. This scenario may imply a benefit could be gained by using extrapolation (e.g., on 10 tones on the left edge and 10 tones on the right edge). Some possible ways to address this may be to add more edge tones in 1×LTF (e.g., instead of 56 tones in 20 MHz, transmit 58 or 60 tones). Techniques to address this, however, may take into account the impact on mask compliance, adjacent channel interference (ACI) targets, and the like. In some cases, 1×LTFs in NDP might not work for flax beamforming. Exactly how to address these issues may depend on the impact of extrapolation loss with VHT-NDP and whether additional tones can be added on the edge without impacting emissions.

In some cases, it may be possible to multiplex data within NDPA frames. For example, if an MU format is used, data may be multiplexed using OFDMA.

Figure 22:
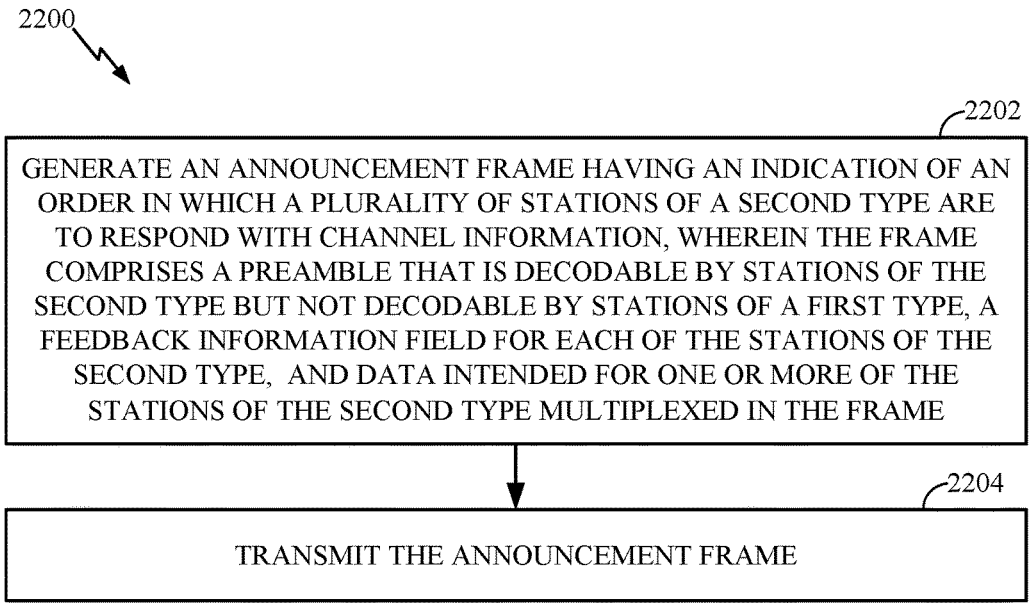
FIG. 22 illustrates example operations that may be performed by an access point, in accordance with aspects of the present disclosure.

FIG. 22 illustrates example operations 2200 that may be performed by an access point for multiplexing data in an announcement frame, in accordance with aspects of the present disclosure.

The operations 2200 begin, at 2202, by generating an announcement frame having an indication of an order in which a plurality of stations of a second type are to respond with channel information, wherein the frame comprises a preamble that is decodable by stations of the second type but not decodable by stations of a first type, a feedback information field for each of the stations of the second type, and data intended for one or more of the stations of the second type multiplexed in the frame. At 2204, the AP transmits the announcement frame.

Figure 23:
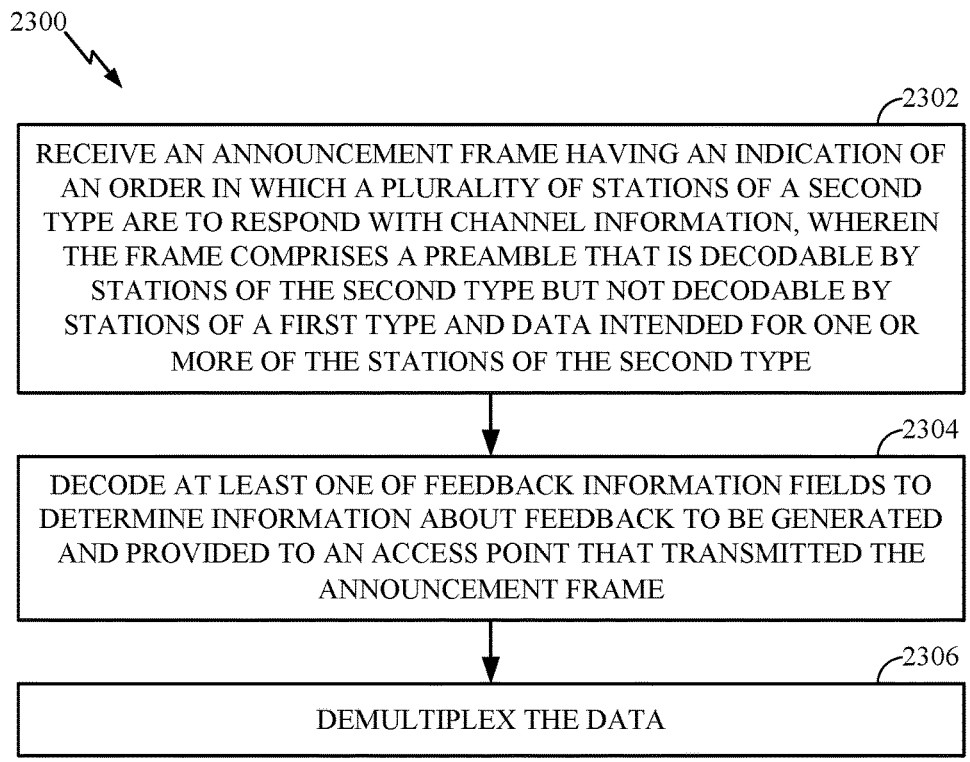
FIG. 23 illustrates example operations that may be performed by a station, in accordance with aspects of the present disclosure.

FIG. 23 illustrates example operations by 2300 a station, for example, to process an announcement frame sent from an AP according to operations 2200.

The operations 2300 begin, at 2302, by receiving an announcement frame having an indication of an order in which a plurality of stations of a second type are to respond with channel information, wherein the frame comprises a preamble that is decodable by stations of the second type but not decodable by stations of a first type and data intended for one or more of the stations of the second type. At 2304, the station decodes at least one of feedback information fields to determine information about feedback to be generated and provided to an access point that transmitted the announcement frame. At 2306, the station demultiplexes the data.

As described above, with reference to FIG. 5A, partial bandwidth feedback reports may take various formats and may contain different types of parameters for a reporting unit. For example, for a given RU or sub-band, the report may include average SNR (across that RU or sub-band) per stream may be listed, the compressed beamforming (V) matrix for each tone (in the RU or sub-band), and delta SNR for each tone (in the RU or sub-band).

According to certain aspects of the present disclosure, a transmitting device (e.g., an access point) may generate and transmit one or more frames that carry a frequency segment for which feedback is requested from one or more receiving devices (e.g., non-AP stations). In response, the receiving devices may generate reports containing the requested feedback. The request for feedback and frequency segment for which feedback is requested may be carried in a single frame or different frames. Aspects of the present disclosure provide various report formats. In some cases, certain report formats may be particularly suitable different mechanisms in which the frequency segment for which feedback is requested.

Figure 24:
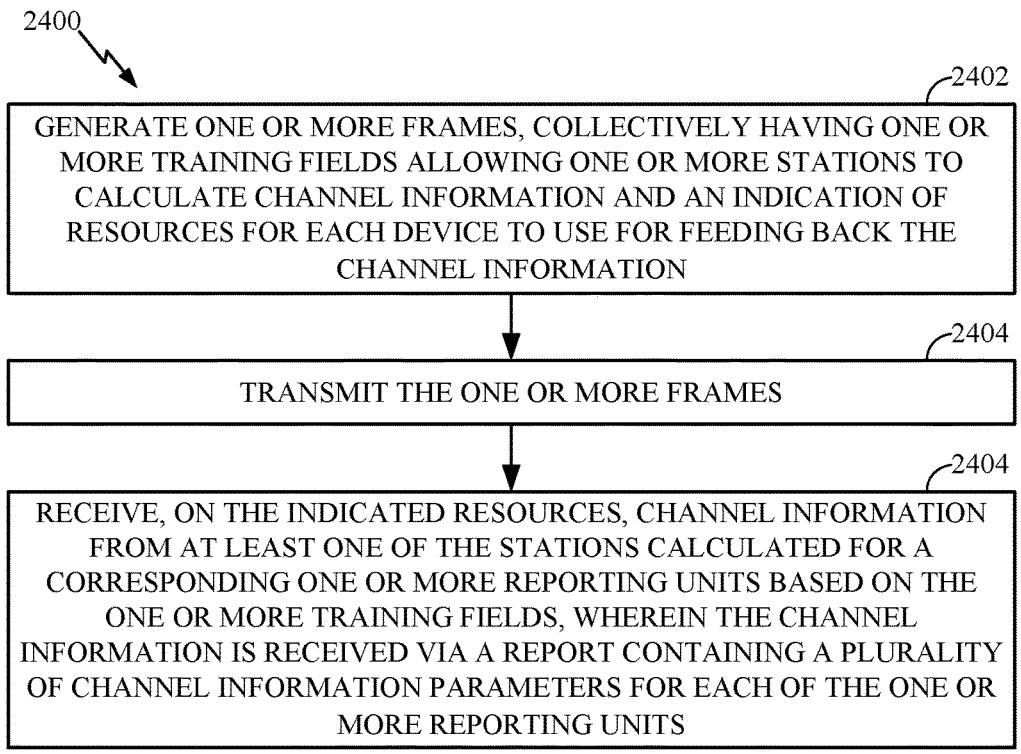
FIG. 24 illustrates example operations that may be performed by an access point, in accordance with aspects of the present disclosure.

FIG. 24 illustrates example operations 2400 that may be performed by an access point, in accordance with aspects of the present disclosure. The operations 2400 begin, at 2402, by generating one or more frames, collectively having one or more training fields allowing one or more stations to calculate channel information and an indication of resources for each device to use for feeding back the channel information. At 2404, the AP transmits the one or more frames and, at 2406, the AP receives, on the indicated resources, channel information from at least one of the stations calculated for a corresponding one or more reporting units based on the one or more training fields, wherein the channel information is received via a report containing a plurality of channel information parameters for each of the one or more reporting units.

Figure 25:
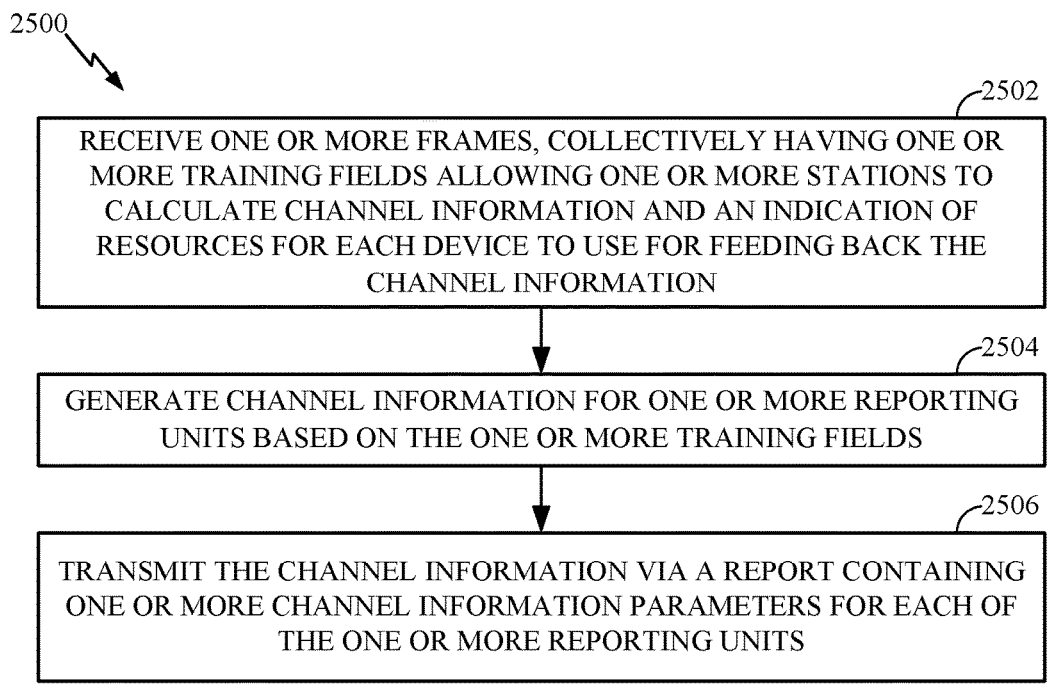
FIG. 25 illustrates example operations that may be performed by a station, in accordance with aspects of the present disclosure.

FIG. 25 illustrates example operations 2500 that may be performed by a station, in accordance with aspects of the present disclosure, to generate and transmit feedback based on frames generated and transmitted by an access point according to operations 2400 described above. The operations 2500 begin, at 2502, by receiving one or more frames, collectively having one or more training fields allowing one or more stations to calculate channel information and an indication of resources for each device to use for feeding back the channel information. At 2504, the station generates channel information for one or more reporting units based on the one or more training fields. At 2506, the station transmits the channel information via a report containing one or more channel information parameters for each of the one or more reporting units.

As noted above, partial band feedback reports may be based on different kinds of reporting units, for example, including per resource unit (RU) based and Sub-band based. Per-RU based may be non-consistent for different PPDU BWs since the location of same-sized RUs may vary across different PPDU BWs, which may result in the sounding packet BW being restricted to be same as final transmission BW. Per-Sub-band based reporting may involve dividing the BW into constant sized blocks (e.g., 2.5 MHz or 5 MHz wide, and AP requests information for a particular block). While per-subband may be more scalable for higher BW (than per-RU reporting), this approach may also result in more feedback overhead (vs the RU based approach) to cover an RU of a given size.

Figure 26A:
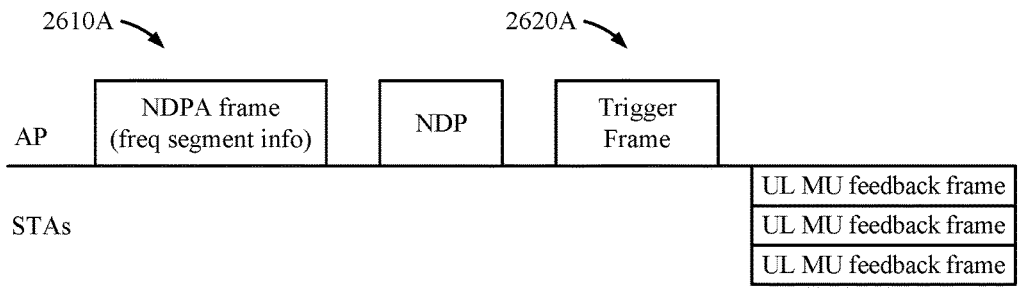
FIGS. 26A-26C illustrate example options for a partial bandwidth feedback and sounding protocol, in accordance with aspects of the present disclosure.

As noted above, partial BW feedback and sounding information may be signaled in different ways. As an example, as illustrated in FIG. 26A, an NDPA frame 2610A may carry the frequency segment for which feedback is being requested. In this example, no such information is carried in a trigger frame 2620A that triggers the feedback.

Figure 26B:
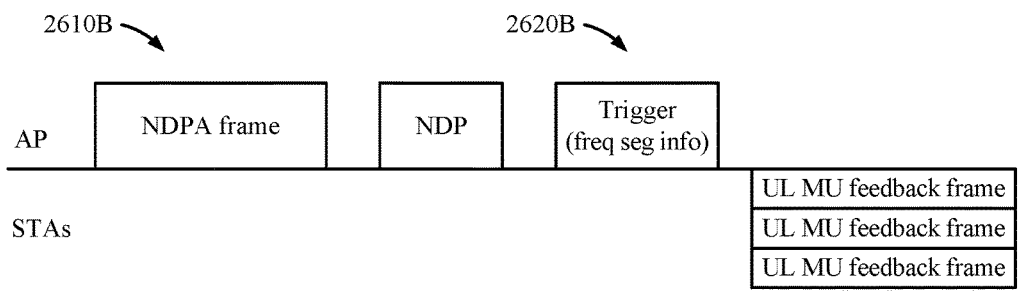

As another option, shown in FIG. 26B, an NDPA 2610B may carry no partial BW information, and the trigger frame 2620B may carry the partial BW information (and do all the down-selection). As still another option, shown in FIG. 26C, an NDPA 2610C may carry partial frequency segment information while the trigger frame 2620C may carry remaining frequency segment information (for further down selection).

Figure 26C:
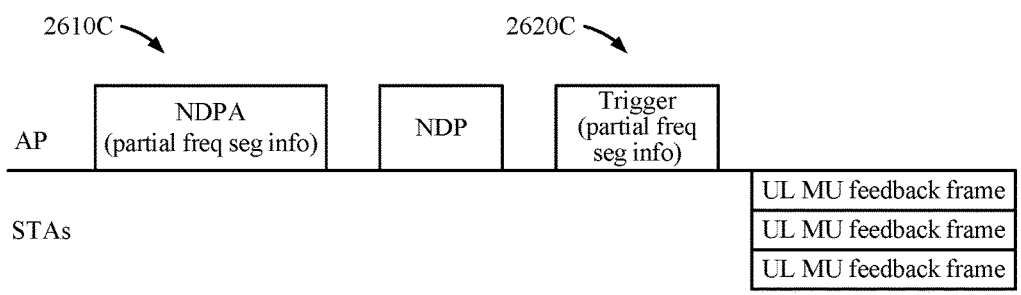

The options shown in FIGS. 26B and 26C provide some degree of flexibility, allowing an AP to change scheduling decisions. These options may also allow for a request for a certain sub-band and RU with another trigger frame (not shown). This may be useful, for example, in case some feedback for some sub-bands was not received correctly. The ability to request feedback with another trigger frame may also be useful if different users have very different CSI payload lengths (in time). As an example, one trigger frame may request part of the feedback (e.g., in MU), while remaining feedback from one station may be requested via SU (or the additional feedback from that station may be requested via MU with a different group of stations than a first request).

As noted above, the format of the feedback report may also vary and, in some cases, a format may be optimized to the triggering options described above. In general, the reporting units may be specified, for example, in RUs or sub-bands and the report may include channel information parameters for each reporting unit. The exact format of the report may vary, for example, based on the type of reporting unit and the parameters reported.

Figure 27A:
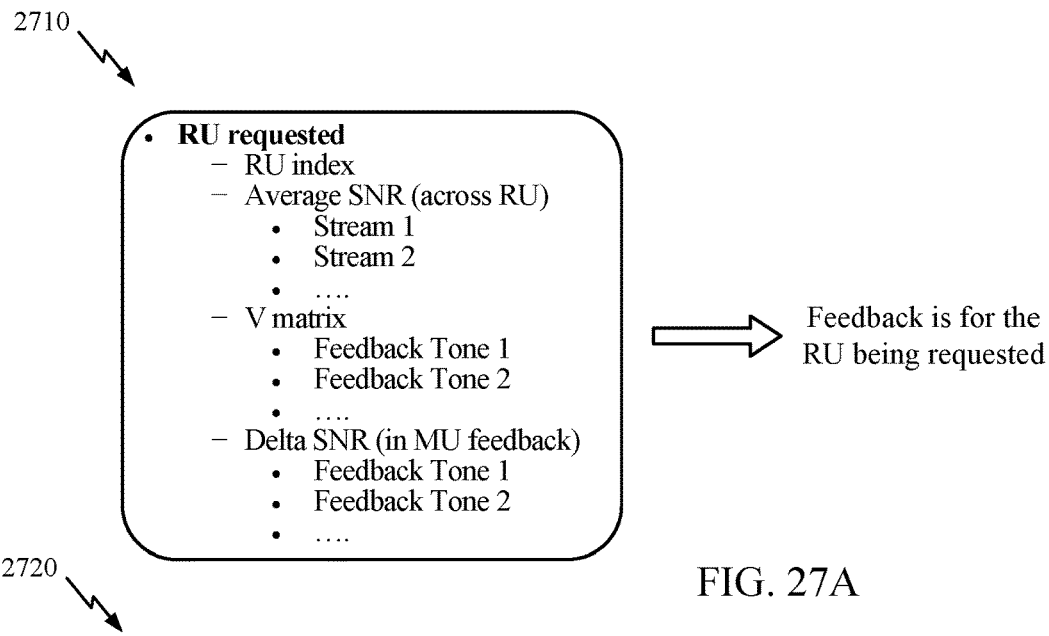
FIGS. 27A-27C illustrate example options for a partial bandwidth feedback report format, in accordance with aspects of the present disclosure.

For example, FIG. 27A illustrates a first report format for RU based reporting. As illustrated, an AP may request feedback for a certain RU per STA and STAs send feedback just for that RU. As illustrated, the example feedback for the RU being requested may include an Average SNR (across an RU specified by an RU index), for each stream, a V matrix per tone, as well as a Delta SNR (in MU feedback) per tone. This reporting format may be most suitable for the triggering option shown in FIG. 26A, as a station is aware of the partial BW information sooner (in the NDPA frame). This report format may present challenges with the options described above with reference to FIGS. 26B and 26C, since the final RU for which feedback is being requested may not be known until after trigger message, which may require reading from memory of channel estimates to format them in the order shown in FIG. 27A (and channel estimates cannot be stored beforehand in the format shown, as the final RU is not known).

Figure 27B:
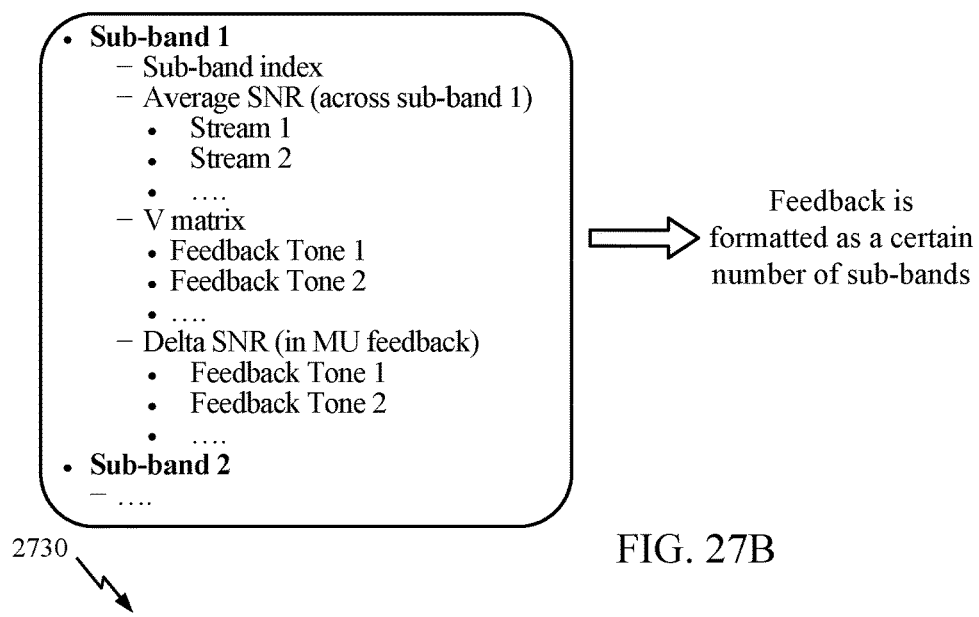

FIG. 27B illustrates a second report format for sub-band based reporting. As illustrated, an AP may request feedback formatted for a certain number of sub-bands. As noted above, each sub-band may be a subdivision of bandwidth, such as 2.5/5 MHz or 32/64 tones in size. As illustrated, the example feedback for each of the sub-band being requested may include an Average SNR (across a sub-band specified by an sub-band index), for each stream, a V matrix per tone, as well as a Delta SNR (in MU feedback) per tone. This reporting format may be suitable for all three of the triggering options shown in FIGS. 26A, 26B, and 26C, as a station may estimate the channel and can store it in memory in the format shown in FIG. 27B and just sends the sub-bands being requested in trigger.

Figure 27C:
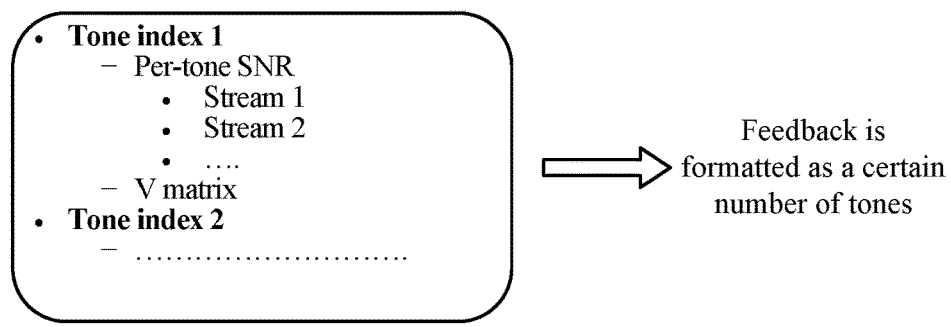

FIG. 27C illustrates a third report format for per-tone based reporting. As illustrated, an AP may request feedback formatted for a certain number of tones. As illustrated, the example feedback for each of the tones being requested may include a per-tone SNR for each stream and a V matrix per tone. This reporting format may be suitable for all three of the triggering options shown in FIGS. 26A, 26B, and 26C, as a station may estimate the channel and can store it in memory in the format shown in FIG. 27C and just sends the tones being requested in trigger. Unfortunately, since the exact set of tones may not be known until trigger arrives (for the options shown in FIGS. 26B and 26C), the station may not be able to calculate the average SNR. As a result, a station may either calculate the average SNR after the trigger message or change the format of the per-tone SNR (e.g., to no longer represent a deviation from the average SNR). In some cases, some of the tones may not need SNR information, for example, if a subsampling factor for S matrix (Ng') is greater than the subsampling factor for the V matrix (Ng), which may lead to inconsistency of per-tone report size.

Aspects of the present disclosure provide various options for compressed beamforming report formats (e.g., for 802.11ax). While the example report format options shown in FIGS. 27A-27C have parameters based on compressed beamforming report formats, such as those defined in 802.11ac, other report format options, suitable for use with the techniques described herein, could be based on other types of feedback (e.g., with parameters defined for differential compressed beamforming report formats).

As described above, for RU-based feedback, a STA may feed back only information the RU being requested, which may be suitable in cases where the NDPA specifies the frequency segment (and no such info in trigger). For Sub-band based feedback, a STA may feed back information the sub-bands being requested, which may be suitable with options where trigger makes the final down-selection of frequency segments. For tone-based feedback, a STA may feed back information tone-by-tone, which may be suitable for per-tone and average SNR feedback.

As described above, in some cases, SU and MU types of feedback may be based on compressed V matrices. MU types of feedback reports may have delta SNR per feedback tone, based on which the SNR per feedback tone could be derived. In such cases, Ng' may be equal to 2*Ng (where Ng' is the tone-grouping for delta SNRs and Ng is the tone grouping for V). On the other hand, reports for SU type feedback may not have any per feedback tone delta SNR feedback. In some cases, only the average per-stream SNR across the entire CSI feedback BW may be included.

In some cases, beamforming (BF) feedback may be also be based on compressed V matrices, as described above. In such cases, Ng' may equal Ng for MU type feedback. Feedback may be requested for a specified set or sets of tones, such as a range of 26-tone RUs. In such cases, the start and end (26 tone) RU may be specified, for example, in an NDPA.

There may generally be three types of BF feedback expected: SU, MU, and CQI-only. Aspects of the present disclosure provide feedback structures for these three feedback types (with example structures shown in FIGS. 28, 29, and 30). Aspects of the present disclosure also provide options for the choice of feedback tones (for which tones feedback is provided).

Figure 28:
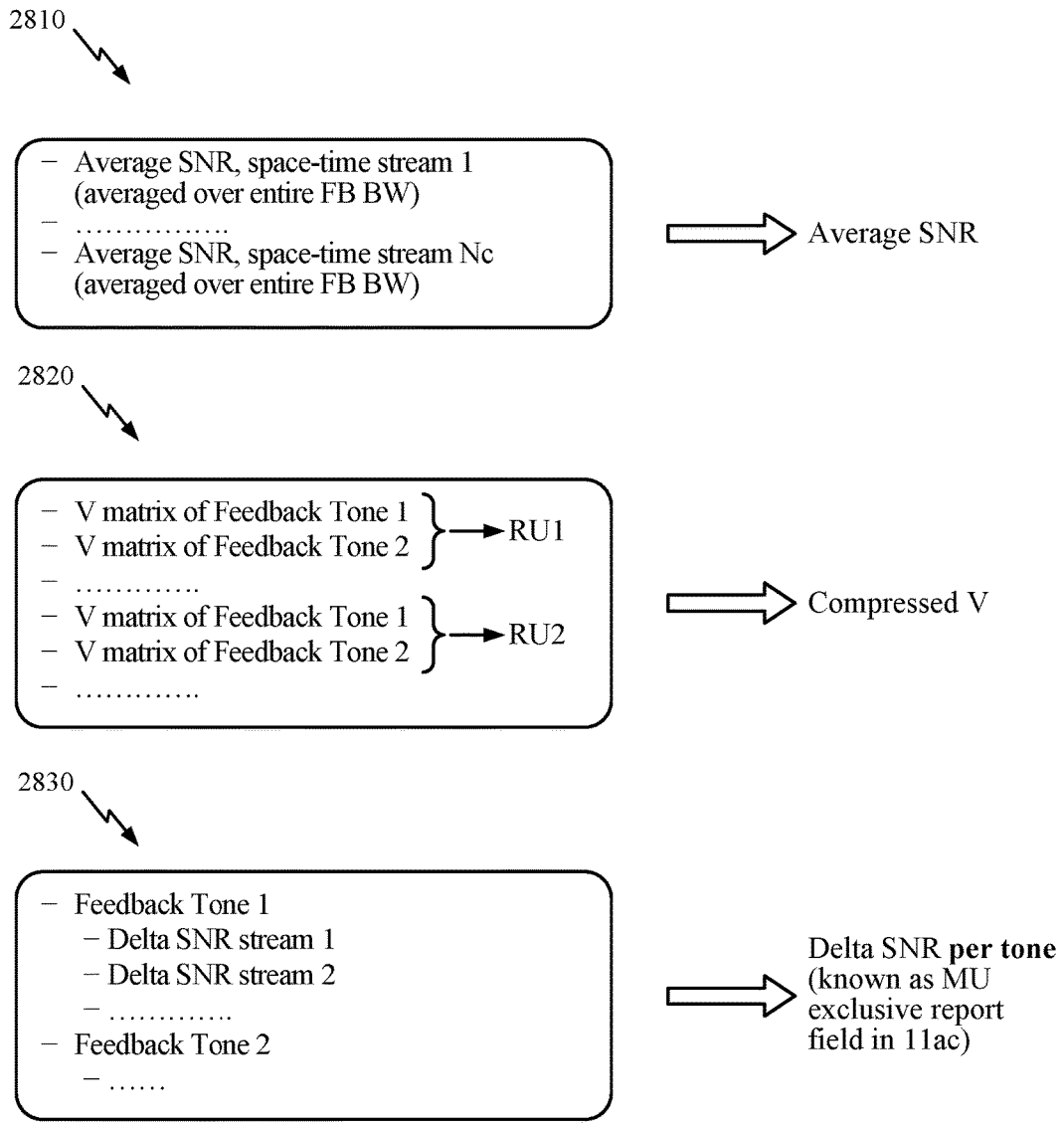
FIG. 28 illustrates an example structure for reporting multi-user (MU) feedback, in accordance with aspects of the present disclosure.

FIG. 28 illustrates an example ("sounding") structure for an MU feedback report. The MU type FB structure shown may be similar to that described above, but with Ng' equal to Ng, as noted above. As illustrated, the report shown in FIG. 28 may include Average SNR, per space-time stream (e.g., averaged over the entire feedback bandwidth for each stream 1 through stream Nc). The report may also in compressed V matrix feedback per feedback tone, for each reporting unit (RU).

As used herein, the term feedback tone generally refers to one of a subset of tones (rather than all tones in the feedback bandwidth) for which feedback information is reported (e.g., for V matrix or delta SNR information). Feedback tones may be selected, for example, depending on Ng and certain rules (e.g., to avoid extrapolation as described below).

Finally, as shown in FIG. 28, the report in may also include Delta SNR information per feedback tone per space-time stream (this information may be referred to as MU exclusive BF report information-as it may be included only in the MU BF feedback structure). The Delta SNR may indicate a difference (delta) from the average SNR per spatial stream or some other reference value.

As noted above, in some cases, the same or similar information may be reported, but with different organization. For example, the report may be organized with a different hierarchy grouping Delta SNR for each feedback tone per stream (rather than Delta SNR for each stream per tone as shown in FIG. 28).

Figure 29:
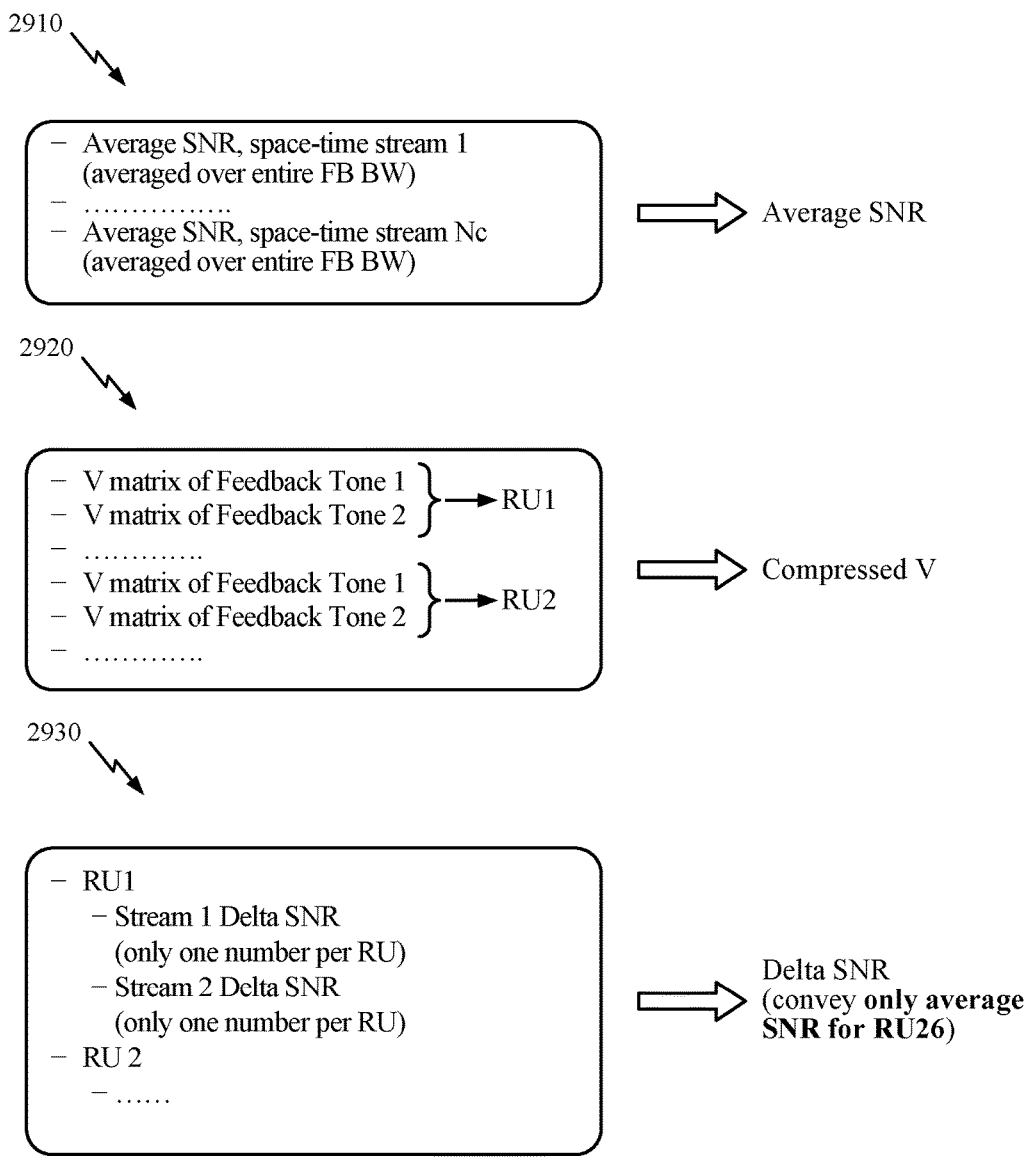
FIG. 29 illustrates an example structure for reporting single-user (SU) feedback, in accordance with aspects of the present disclosure.

FIG. 29 illustrates an example structure for an SU feedback report. As noted above, in some cases, SU type feedback may not contain any type of frequency varying SNR information. In other words, as shown, the example SU feedback report may not include the MU exclusive BF report information noted above.

As noted above, however, it may make sense to have some coarse frequency varying SNR information, for example, to aid in OFDMA scheduling. Therefore, as shown in FIG. 29, rather than delta SNRs per tone as in MU, in SU type feedback may be provided as one (a single) reported number per reporting unit (e.g., per 26 tone RU or RU26) (different for each stream) being fed back. This information provides some coarse information regarding frequency selectivity which may be useful for scheduling. As an alternative way to provide such coarse information, a station may report delta SNR information for tones at a sub-sampled rate, for example, at Ng' equal to 16. As FIG. 29 illustrates, this information may be provided using an SU structure that may be considered a modified version of the MU structure shown in FIG. 28.

Figure 30:
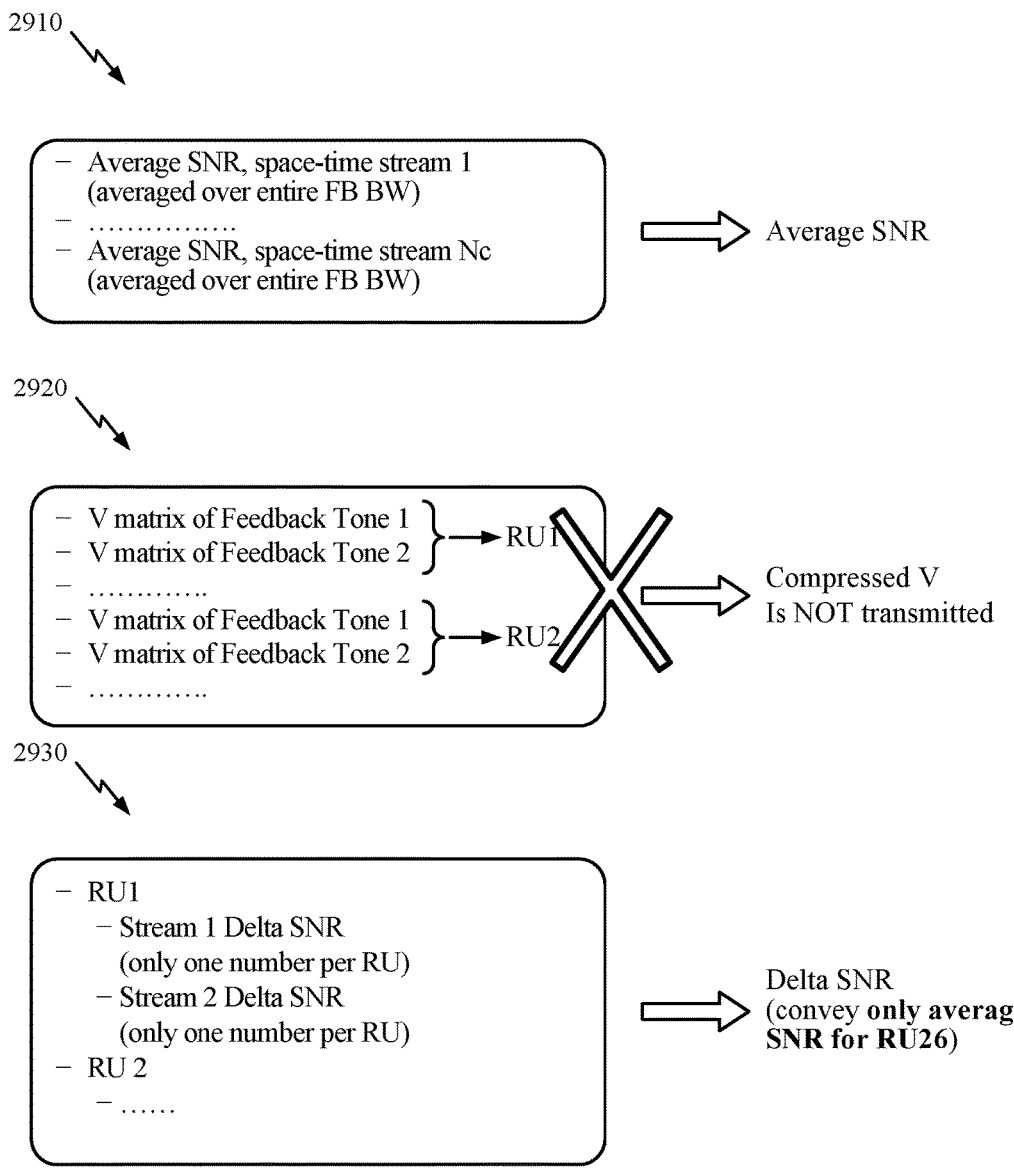
FIG. 30 illustrates an example structure for reporting CQI-only feedback, in accordance with aspects of the present disclosure.

FIG. 30 illustrates an example structure for a "CQI-only" feedback report. As illustrated, this structure may be similar to the SU feedback structure shown in FIG. 29, but without the compressed V-matrix information.

Different factors may be considered when determining exactly which tones should be included with feedback information in the reports described above. One approach is to include tones correspond to a start and an end reporting unit (e.g., RU26), for example, indicated as the feedback BW in an NDPA. In some cases, there here is a single feedback grid (indicating tones for feedback) for each BW. The idea may be to feedback tones of the grid that overlap with the RUs between and including start and end RU26.

In some cases, FB tones may be chosen to be the smallest subset of the FB grid (indicating FB tones) that can avoid extrapolation for channel estimation on the RUs being requested. In such cases, some tones outside the RUs being requested may need to be fed back in order to avoid extrapolation.

Figure 31:
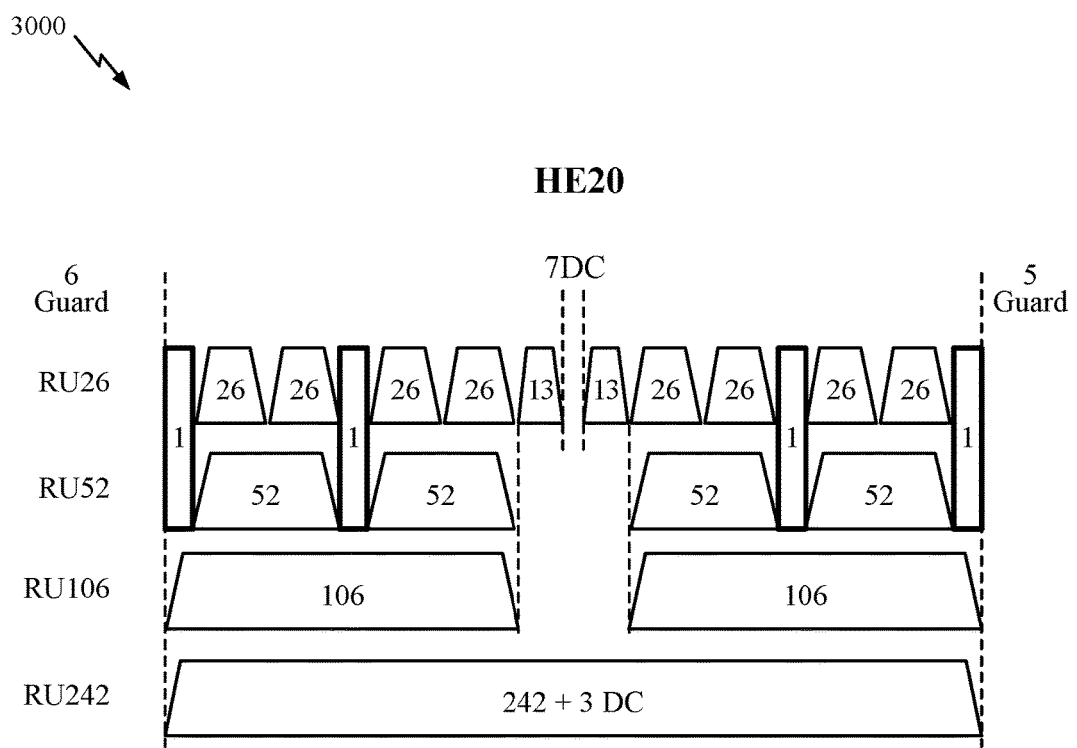
FIG. 31 illustrates an example grid showing tones for feeding back information, in accordance with aspects of the present disclosure.

FIG. 31 illustrates one example of an FB grid for NDP bandwidth 20 MHz and Ng equal to 4, with tones that range in indices from [−120:4:−4, 4:4:120] plus edge tones at indices (±2,±122). One example to consider is with feedback requested (e.g., in an NPDA) for only the 2nd RU. Per the grid, the 2nd RU is the following tones [−95:1:−70]. In the illustrated example, the FB grid overlap with this RU is [−92:4:−72]. In this case, the following 2 additional tones from the grid, (−96, −68), may be fed back to avoid extrapolation.

In some cases, it may be possible or desirable to eliminate SU type feedback. The decision to eliminate SU type feedback may be made based on a comparison of the overhead of SU feedback (e.g., per the structures described herein), for example, with Ng equal to 16 and MU type feedback also with Ng equal to 16. The comparison may assume the use of codebook=1 for SU and codebook=0 for MU, such that they have similar bit width.

As shown in the table illustrated in FIG. 32, in this example, MU may be shown to have 25-27% more overhead in the 4×1 case, and 22-24% more overhead in the 8×2 case, with the number of RUs being requested determining the exact number. Another consideration, weighing against eliminating SU-type feedback is that there may be protocols that are dependent on the existence of a separate SU type feedback. For example, a single STA may receive a request for SU type feedback that has some special protocol implications (e.g. Beamformer/Beamformee control, no trigger, or the like).

As described above, an NDP frame may include the training fields used to generate requested feedback (e.g., reported using the structures described herein). Various mechanisms may be used in order to allow detection of an NDP frame (such as an HE-NDP frame). For example, some cases may use the combination of length field in L-SIG and Nsts in SIG-A to detect that this is an HE-NDP. An alternative approach is to utilize a bit, for example, in a SIG-A field or to use a state of a field or a combination (of field states/values) which are disallowed in non-NDP packets.

In some cases, CQI only SNR may be beamformed or open-loop. In some cases, keeping CQI only SNR as beamformed may be desirable as the notion of a singular value may be well understood. Open loop SNR may be possible, but may require MMSE processing, which might lead to variations across vendors. In some cases, BF SNR may be used to get an approximate notion of open loop SNR through empirically derived heuristics.

FIG. 33 illustrates another example structure for MU feedback report. As illustrated, the structure may include the same or similar information as shown in FIG. 28, but may be reorganized. For example, the compressed V matrix information (per feedback tone) and delta SNR information (per feedback tone and per stream) may be grouped per RU. As noted, the information for each RU may not be exactly the same in size, for example, as different (RU26) resource units may have a different number of FB tones.

FIG. 34 illustrates another example structure for an SU feedback report. As with FIG. 33, the compressed V matrix and delta SNR information may be grouped per RU. Further, as described above with reference to FIG. 29, a single delta SNR value may be provided (per stream) for each RU.

FIG. 35 illustrates another example structure for an SU feedback report. As illustrated in FIG. 35, for a CQI only feedback report, the compressed V matrix information (for each RU) may not be transmitted.

Example Control Field

According to certain aspects of the present disclosure, various sounding parameters described above may be conveyed in a control field.

Figure 36:

For example, FIG. 36 illustrates an example format of a control field 3600 which may be an HE MIMO Control Field. In general, the HE MIMO Control field may be present in a frame. The presence and contents of fields (e.g., an HE Compressed Beamforming Report field, HE MU Exclusive Beamforming Report field and HE CQI-only Report field) may be dependent on the values of Feedback Type subfield of the HE MIMO Control field.

As illustrated, the example control field may lack a BW indication and may include a 4 bit sounding dialog token (such that the control field is 4 bytes total). Such an HE MIMO Control field may be included in every HE Compressed Beamforming frame.

The parameters in the HE control field may be changed relative to the parameters of a VHT control field. For example, the 2-bit channel width (of 20 MHz, 40 MHz, 80 MHz, 160/80+80 MHz) in the VHT MIMO control field is replaced by the RU_Start_Index (7 bits) and RU_End_Index (7 bits), using 14 bits in total to indicate the RUs in feedback in the HE MIMO control field. The 2-bit grouping (Ng of 1, 2, 4) in the VHT MIMO control field is replaced by the grouping (Ng of 4, 16) indicated with a single bit (e.g., with 0: Ng=4, 1: Ng=16) in the HE MIMO control field. The 1-bit feedback type (SU/MU) in the VHT MIMO control field is replaced by the Feedback type (SU/MU/CQI only) conveyed with 2 bits (e.g., 0: SU, 1: MU, 2: CQI only, 3: Reserved). The Sounding Dialog Token Number may be Reduced from 6 bits in the VHT MIMO control field to 4 bits in the HE MIMO control field. In this example, since there is no BW signaled, the BeamFormer may need to remember the BW from NDPA/NDP.

Figure 37:
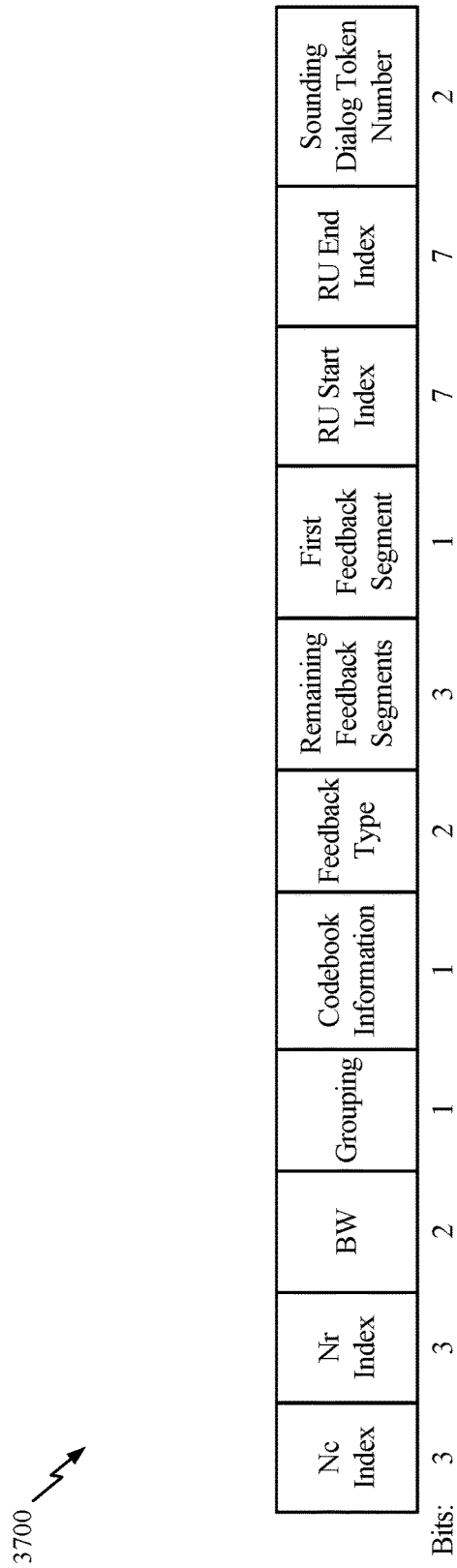

FIG. 37 illustrates another example format of a control field 3700 which may be an HE MIMO Control Field. This example control field may also be 4 bytes and the fields may be similar to those described above, with reference to FIG. 36, however the Sounding Dialog Token Number may be (further) reduced to 2 bits. Further, in this example, the BW (of 20 MHz, 40 MHz, 80 MHz, 160/80+80 MHz) is signaled using 2 bits (e.g., with 0: 20 MHz, 1: 40 MHz, 2: 80 MHz, 3: 160/80+80 MHz) in the HE-MIMO control field, making the CBF frame completely self-contained.

FIGS. 38A and 38B illustrate other example formats of control fields 3800A and 3800B, respectively, which may be an HE MIMO Control Field. This example control field may be 5 bytes. Again, the fields may be similar to those described above, with reference to FIG. 36, however the extra (byte) width may allow a Sounding Dialog Token Number of 6 bits and for 4 reserved bits. Again, in this example, the BW (of 20 MHz, 40 MHz, 80 MHz, 160/80+80 MHz) is signaled using 2 bits (e.g., with 0: 20 MHz, 1: 40 MHz, 2: 80 MHz, 3: 160/80+80 MHz) in the HE-MIMO control field, making the CBF frame completely self-contained. As illustrated, the reserved bits may be included at the end (per FIG. 38A) or before the Sounding Dialog Token Number (per FIG. 38B).

As described above, aspects of the present disclosure provide various techniques for a (beamformer) access point to specify the type of feedback required from one or more stations for MU-MIMO communications. By specifying the reporting units to be used and the channel information parameters to be generated, for each reporting unit, the AP may be able to efficiently receive feedback useful for generating steering matrices for subsequent MU-MIMO communications.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for generating and means for determining may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a period that at least one second apparatus is scheduled to be awake, instructions for generating a first frame for transmission to the second apparatus during the period, instructions for outputting the first frame for transmission, instructions for obtaining a second frame in response to the first frame, instructions for determining ranging information based on a time difference between transmission of the first frame and receipt of the second frame, instructions for generate a third frame including the ranging information, and instructions for outputting the third frame for transmission. In another example, instructions for determining a period to awake from a low power state, instructions for obtaining a first frame from a second apparatus during the period, instructions for generating a second frame for transmission to the second apparatus in response to the first frame, instructions for outputting the second frame for transmission to the second apparatus, instructions for obtaining a third frame comprising ranging information, determined by the second apparatus, based on a time difference between transmission of the first frame and receipt of the second frame, and instructions for determining a relative location of the second apparatus to the first apparatus based on a third frame.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating one or more frames, collectively having one or more training fields allowing one or more stations to calculate channel information and an indication of resources for the one or more stations to use for feeding back the channel information via a report, wherein the one or more frames comprise information indicating one or more resource units (RUs) for which channel information is requested and each RU comprises one or more tones;
transmitting the one or more frames and an indication of the types of channel information parameters to include in the report; and
receiving, on the indicated resources, the channel information from at least one of the stations calculated for the one or more RUs based on the one or more training fields, wherein:
the channel information is received via the report;
the report includes a plurality of channel information parameters for each of the one or more RUs; and the plurality of channel information parameters are based on the indicated types of channel information parameters.

2. The method of claim 1, wherein the indication is signaled via a multiple input multiple output (MIMO) control field.

3. The method of claim 1, wherein the one or more frames comprise:
at least one announcement frame and at least one trigger frame.

4. The method of claim 3, wherein the announcement frame comprises information indicating the one or more RUs.

5. The method of claim 3, wherein the trigger frame comprises information indicating the one or more RUs.

6. The method of claim 3, wherein:
the announcement frame comprises first partial information; and
the trigger frame comprises second partial information, wherein the first and second partial information collectively indicate the one or more reporting units.

7. The method of claim 1, wherein the report comprises compressed V-matrix information.

8. The method of claim 7, wherein:
the report comprises compressed V-matrix information for the one or more tones of each of the one or more RUs.

9. A method for wireless communications, comprising:
receiving one or more frames, collectively having one or more training fields allowing one or more stations to calculate channel information and an indication of resources for the one or more stations to use for feeding back the channel information via a report, wherein:
the one or more frames comprise information indicating one or more resource units (RUs) for which the channel information is requested; and
each RU comprises one or more tones;
receiving signaling providing an indication of types of channel information parameters to include in the report;
generating the channel information for the one or more RUs based on the one or more training fields; and
transmitting the channel information via the report, wherein the report includes a plurality of channel information parameters for each of the one or more RUs, and the one or more channel information parameters are based on the indicated types of channel information parameters.

10. The method of claim 9, wherein the indication is received via a multiple input multiple output (MEMO) control field.

11. The method of claim 9, wherein the one or more frames comprise:
at least one announcement frame and at least one trigger frame.

12. The method of claim 11, wherein the announcement frame comprises information indicating the one or more RUs.

13. The method of claim 11, wherein the trigger frame comprises information indicating the one or more RUs.

14. The method of claim 11, wherein:
the announcement frame comprises first partial information; and
the trigger frame comprises second partial information, wherein the first and second partial information collectively indicate the one or more RUs.

15. The method of claim 9, wherein the report comprises compressed V-matrix information.

16. The method of claim 15, wherein:
the report comprises compressed V-matrix information for the one or more tones of each of the one or more RUs.

17. An apparatus for wireless communications, comprising:
a memory; and
at least one processor coupled with the memory and configured to:
generate one or more frames, collectively having one or more training fields allowing one or more stations to calculate channel information and an indication of resources for the one or more stations to use for feeding back the channel information via a report, wherein the one or more frames comprise information indicating one or more resource units (RUs) for which channel information is requested and each RU comprises one or more tones;
transmit the one or more frames and an indication of the types of channel information parameters to include in the report; and
receive, on the indicated resources, the channel information from at least one of the stations calculated for the one or more RUs based on the one or more training fields, wherein:
the channel information is received via the report;
the report includes a plurality of channel information parameters for each of the one or more RUs; and
the plurality of channel information parameters are based on the indicated types of channel information parameters.

18. The apparatus of claim 17, wherein the indication is signaled via a multiple input multiple output (MIMO) control field.

19. The apparatus of claim 17, wherein the one or more frames comprise:
at least one announcement frame and at least one trigger frame.

20. The apparatus of claim 19, wherein the announcement frame comprises information indicating the one or more RUs.

21. An apparatus for wireless communications, comprising:
a memory; and
at least one processor coupled with the memory and configured to:
receive one or more frames, collectively having one or more training fields allowing one or more stations to calculate channel information and an indication of resources for the one or more stations to use for feeding back the channel information via a report, wherein:
the one or more frames comprise information indicating one or more resource units (RUs) for which the channel information is requested; and
each RU comprises one or more tones;
receive signaling providing an indication of types of channel information parameters to include in the report;
generate the channel information for the one or more RUs based on the one or more training fields; and
transmit the channel information via the report, wherein the report includes a plurality of channel information parameters for each of the one or more RUs, and the one or more channel information parameters are based on the indicated types of channel information parameters.

22. The apparatus of claim 21, wherein the indication is signaled via a multiple input multiple output (MIMO) control field.

23. The apparatus of claim 22, wherein the one or more frames comprise:
   at least one announcement frame and at least one trigger frame.

24. The apparatus of claim 23, wherein the announcement frame comprises information indicating the one or more RUs.

* * * * *